(12) United States Patent
Eisaman et al.

(10) Patent No.: US 8,784,632 B2
(45) Date of Patent: Jul. 22, 2014

(54) HIGH-PRESSURE ELECTRODIALYSIS DEVICE

(75) Inventors: Matthew D. Eisaman, Redwood City, CA (US); Karl A. Littau, Palo Alto, CA (US); Daniel Larner, San Jose, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 623 days.

(21) Appl. No.: 12/969,465

(22) Filed: Dec. 15, 2010

(65) Prior Publication Data

US 2012/0152747 A1  Jun. 21, 2012

(51) Int. Cl.
*B01D 61/46* (2006.01)

(52) U.S. Cl.
USPC ........... 204/631; 204/633; 204/634; 204/635; 204/636

(58) Field of Classification Search
USPC ...................... 204/631, 633, 634, 635, 636
See application file for complete search history.

(56) References Cited

U.S. PATENT DOCUMENTS

| | | | |
|---|---|---|---|
| 3,878,086 A | | 4/1975 | Haswell et al. |
| 3,933,617 A | * | 1/1976 | Yamamoto et al. ........... 204/636 |
| 4,107,015 A | | 8/1978 | Chlanda et al. |
| 4,584,077 A | | 4/1986 | Chlanda et al. |
| 4,592,817 A | | 6/1986 | Chlanda et al. |
| 4,636,289 A | | 1/1987 | Mani et al. |
| 5,292,422 A | | 3/1994 | Liang et al. |
| 2004/0060823 A1 | | 4/2004 | Carson et al. |
| 2005/0051485 A1 | | 3/2005 | Saini |
| 2006/0051274 A1 | | 3/2006 | Wright et al. |
| 2007/0169625 A1 | | 7/2007 | Aines et al. |
| 2007/0187247 A1 | | 8/2007 | Lackner et al. |
| 2008/0031801 A1 | | 2/2008 | Lackner et al. |
| 2008/0087165 A1 | | 4/2008 | Wright et al. |
| 2009/0159456 A1 | | 6/2009 | Littau |

(Continued)

FOREIGN PATENT DOCUMENTS

| | | |
|---|---|---|
| EP | 2 163 294 | 3/2010 |
| WO | WO 03/033122 | 4/2003 |
| WO | WO 2006/036396 | 4/2006 |

OTHER PUBLICATIONS

M.D. Eisaman, D.E. Schwartz, S. Amic, D. Larner, J. Zesch, F. Torres and K. Littau, Energy-efficient electrochemical CO2 capture from the atmosphere, Technical Proceedings of the 2009 Clean Technology Conference and Trade Show, 2009, pp. 175-178.

(Continued)

*Primary Examiner* — Arun S Phasge
(74) *Attorney, Agent, or Firm* — Palo Alto Research Center Incorporated

(57) ABSTRACT

An apparatus for performing electrodialysis at pressures greater than or equal to the ambient pressure is described. The apparatus includes an electrodialysis membrane stack and housing. The electrodialysis membrane stack includes at least one electrodialysis cell. The electrodialysis apparatus includes electrodes that apply voltage across the electrodialysis stack. The housing pressurizes the electrodialysis stack at a stack pressure. The housing includes a cell chamber that receives the electrodialysis stack, the cell chamber including at least one pressurization port communicating with the cell chamber such that a portion of electrode solution is transmittable into a region of the cell chamber outside the electrodialysis stack. A system for performing electrodialysis at pressures greater than ambient pressure includes at least two solution loops, an electrode solution loop, and an electrodialysis apparatus operatively connected to the solution and electrode solution loops that performs electrodialysis at a stack pressure that is greater than ambient pressure.

23 Claims, 17 Drawing Sheets

(56) References Cited

U.S. PATENT DOCUMENTS

| | | |
|---|---|---|
| 2009/0233155 A1 | 9/2009 | Littau |
| 2009/0294366 A1 | 12/2009 | Wright et al. |
| 2009/0301297 A1 | 12/2009 | Littau |
| 2010/0005959 A1 | 1/2010 | Littau et al. |
| 2010/0059377 A1 | 3/2010 | Littau et al. |

OTHER PUBLICATIONS

R.J. Pearson, J.W.G. Turner, M.D. Eisaman, and K.A. Littau, Sustainable Organic Fuels for Transport (SOFT)—A Concept for Compatible Affordable Mobility Using Carbon-Neutral Liquid Fuels, Proceedings of SIA (Société des Ingénieurs de l'Automobile) 2009, 11 pages, Strasbourg, France, Dec. 2-3, 2009.

R.J. Pearson, J.W.G. Turner, M.D. Eisaman, and K.A. Littau, Extending the Supply of Alcohol Fuels for Energy Security and Carbon Reduction, Proceedings of SAE 2009 Powertrains Fuels and Lubricants Meeting, Nov. 2009, 28 pages, San Antonio, TX, paper No. 2009-01-2764.

Matthew D. Eisaman, Luis Alvarado, Bhaskar Garg, Dan Larner, and Karl A. Littau, $CO_2$ concentration using bipolar membrane electrodialysis, poster presented at Gordon Research Conference on Electrochemistry, Ventura, CA, Jan. 10-15, 2010.

H. Nagasawa, A. Yamasaki, A. Iizuka, K. Kumagai and Y. Yanagisawa, A New Recovery Process of Carbon Dioxide from Alkaline Carbonate Solution via Electrodialysis, Dec. 2009, pp. 3286-3293, AIChE Journal, vol. 55, Issue 12.

H. Nagasawa, A. Yamasaki, and Y. Yanagisawa, Carbon Dioxide Recovery from Carbonate Solutions by an Electrodialysis Method, 6th Annual Conference on Carbon Capture & Sequestration, May 7-10, 2007, 7 pages.

Moon-Sung Kang, Seung-Hyeon Moon, You-In Park, and Kew-Ho Lee, Development of Carbon Dioxide Separation Process Using Continuous Hollow-Fiber Membrane Contactor and Water-Splitting Electrodialysis, Separation Science and Technology, 2002, pp. 178-1806, vol. 37, Issue 8.

X. Zhang, W. Lu, H. Ren, W. Cong, Sulfuric Acid and Ammonia Generation by Bipolar Membrane Electrodialysis: Transport Rate Model for Ion and Water Through Anion Exchange Membrane, Chemical and Biochemical Engineering Quarterly, 2008, pp. 1-8, vol. 22, Issue 1.

IPCC, Climate Change 2007: Synthesis Report. Contribution of Working Groups I, II and III to the Fourth Assessment Report of the Intergovernmental Panel on Climate Change, 2007, 104 pages, Geneva, Switzerland.

F.S. Zeman, D.W. Keith, Carbon Neutral Hydrocarbons, Philosophical Transactions of the Royal Society, 2008, pp. 3901-3918, vol. 366, Issue 1882.

M. Eisaman, D. Schwartz, S. Amic, R. Stumpp, D. Larner, J. Zesch, and K. Littau, Carbon-Neutral Liquid Fuel from Sunlight, Air, and Water, poster presented at Gordon Research Conference on Renewable Energy: Solar Fuels, Ventura, CA, Feb. 1-6, 2009.

M. D. Eisaman, L. Alvarado, D. Larner, P. Wang, B. Garg, and K. A. Littau, $CO_2$ separation using bipolar membrane electrodialysis, Energy and Environmental Science, Oct. 29, 2010, 10 pages, Royal Society of Chemistry, UK.

V. I. Zabolotskii, et al., Regeneration of Monoethanolamine-Based Sorbents of Carbon Dioxide by Electrodialysis with Bipolar Membranes, J. Appl. Chem., 1985, pp. 2222-2225, vol. 58.

International Conference and Exhibition, The Spark Ignition Engine of the Future: Facing the $CO_2$ and Electrification Challenges, Dec. 2 & 3, 2009.

Ameridia, "Bipolar Membrane Electrodialysis," http://www.ameridia.com/html/eb.html (Accessed Mar. 1, 2011).

Dr. Pieter Tans, "Trends in Atmospheric Carbon Dioxide", NOAA/ESRL, www.esrl.noaa.gov/gmd/ccgg/trends, (Accessed Mar. 1, 2011).

Calera, Green Cement for a Blue Planet, http://www.calera.com/index.php/technology/technology_vision/ (Accessed Mar. 1, 2011).

PARC, Renewable Liquid Fuels, http://www.parc.com/work/focus-area/adaptive-energy/ (Accessed Mar. 1, 2011).

G.A. Olah, A. Goeppert, and G.K. Surya Prakash, Beyond Oil and Gas: The Methanol Economy, 2006, pp. 239-247, Wiley-VCH, Germany.

Partial European Search Report for European Application No. 11193027.7, dated Apr. 5, 2012 (4 pages).

\* cited by examiner

US 8,784,632 B2

HIGH-PRESSURE ELECTRODIALYSIS DEVICE

STATEMENT REGARDING FEDERALLY SPONSORED RESEARCH AND DEVELOPMENT

This invention was made with Government support under contract NBCHC090074 awarded by DARPA, an agency of the United States Department of Defense. The Government has certain rights in this invention.

CROSS-REFERENCE TO RELATED APPLICATIONS

This application is related to U.S. patent application Ser. No. 12/969,485.

BACKGROUND

The concentration of atmospheric carbon dioxide ($CO_2$) continues to rise, as shown by, for example, IPCC, *Climate Change 2007: Synthesis Report. Contribution of Working Groups I, II and III to the Fourth Assessment Report of the Intergovernmental Panel on Climate Change*, 2007 [Core Writing Team, Pachauri, R. K and Reisinger, A. (eds.)], IPCC, Geneva, Switzerland, 104 pp. It is becoming increasingly imperative to invent efficient and cost-effective technologies for controlling the atmospheric $CO_2$ concentration.

Techniques for removing $CO_2$ from streams of mixed gases, such as removing the $CO_2$ from power-plant flue-gas emissions or removing $CO_2$ from the atmosphere, typically involve a two-step process of capture and regeneration. First, the gas is contacted with an aqueous "pre-capture solution" that reacts with the $CO_2$ gas in the mixed-gas stream, "capturing" the $CO_2$ into what is then referred to as a "post-capture solution." Next, a stream of pure $CO_2$ gas is regenerated from this $CO_2$-rich aqueous post-capture solution. Various pre-capture solutions exist, with different solutions being preferred depending on the concentration of $CO_2$ in the mixed gas source. For mixed gas streams with low concentrations of $CO_2$—such as the atmosphere with a $CO_2$ concentration of 386 parts per million (ppm) as of 2009 as shown by Dr. Pieter Tans, NOAA/ESRL—aqueous hydroxide pre-capture solutions such as potassium hydroxide (KOH) or sodium hydroxide (NaOH), aqueous carbonate pre-capture solutions such as potassium carbonate ($K_2CO_3$) or sodium carbonate ($Na_2CO_3$), or aqueous bicarbonate pre-capture solutions such as potassium bicarbonate ($KHCO_3$) or sodium bicarbonate ($NaHCO_3$) are likely candidates for $CO_2$ pre-capture solutions. The capture of $CO_2$ gas into these pre-capture solutions converts the original hydroxide/carbonate/bicarbonate pre-capture solutions into a more acidic post-capture solution consisting of a mixture of hydroxide (KOH or NaOH), carbonate ($K_2CO_3$ or $Na_2CO_3$), and/or potassium bicarbonate ($KHCO_3$) or sodium bicarbonate ($NaHCO_3$) post-capture solutions, as examples.

Once the $CO_2$ gas is captured from the mixed-gas stream into the pre-capture solutions in the ionic forms $CO_3^{(2-)}$ and/or $HCO_3^-$ to form the post-capture solutions, pure $CO_2$ gas is typically regenerated from the solution. The overall effect of this process of capture and regeneration is the separation and concentration of $CO_2$ gas from a pre-separation mixed-gas stream with a relatively low mole fraction of $CO_2$ gas into a post-separation gas stream that possesses a higher mole fraction of $CO_2$ gas than the pre-separation stream. Under the right conditions, the mole fraction of $CO_2$ in the post-separation stream may be unity, that is, the post-separation stream may be a pure stream of $CO_2$ gas. After capture and regeneration, the post-separation gas can then be, for example, geologically sequestered, or incorporated into useful products such as concrete, as shown by Calera, Green Cement for a Blue Planet; plastics, as shown by G. A. Olah et al., Beyond Oil and Gas: The Methanol Economy, Wiley-VCH (2006); or liquid hydrocarbon fuels, as shown by F. S. Zeman & D. W. Keith, Carbon Neutral Hydrocarbons, Phil. Trans. R. Soc. A, 366, 3901-3918 (2008), and PARC, Renewable Liquid Fuels. Many of the possible uses of the regenerated $CO_2$, such as sequestration or reaction to liquid fuels, for example, require the pressurization of the $CO_2$ to pressures greater than 1 atm.

Bipolar membrane electrodialysis (BPMED) can be used to convert aqueous salt solution into acids and bases without the addition of other chemicals. A component of BPMED devices is ion exchange membranes used to separate ionic species in solution when an electrical field is applied across the membranes. Performing BPMED on certain solutions may create gas bubbles adjacent to the membrane surface that can block ion transport and reduce the effective membrane surface area, causing increased cell resistance and localized "hot spots" of very high current density that lead to shortened membrane lifetimes. As a result, commonly used input and output solutions are selected so that they do not evolve significant quantities of gas inside the membrane stack at ambient pressure, which excludes an entire class of gas-evolving solutions from electrodialytic treatment. Example embodiments address these and other disadvantages of the conventional art.

DETAILED DESCRIPTION

Figure 1:
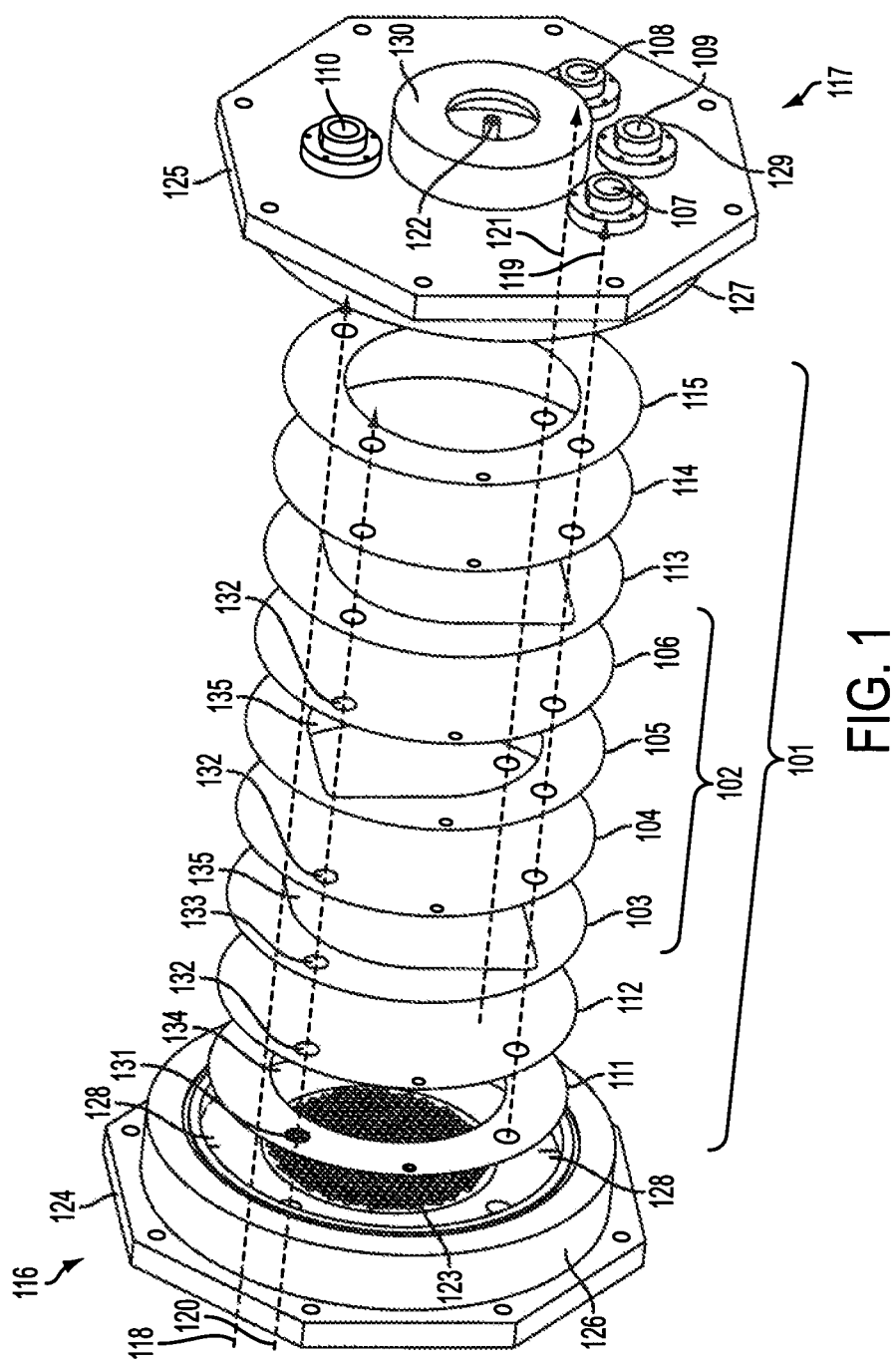
FIG. 1 is an exploded view of an embodiment of a high-pressure electrodialysis apparatus.

An embodiment of a high-pressure electrodialysis device has unique advantages for the regeneration of $CO_2$ gas from post-capture solutions for use in, for example, liquid hydrocarbon fuel synthesis or geological sequestration. The efficient synthesis of liquid hydrocarbon fuel from $CO_2$ gas and $H_2$ gas reactants requires the gases to be reacted at elevated temperatures and pressures, typically at least 200 degrees Celsius and 40 atm. The geological sequestration of $CO_2$ gas typically requires pressurization of the $CO_2$ to 150 atm. What is needed, then, is a means for regenerating $CO_2$ from post-capture solutions at elevated pressures so that the pressurized $CO_2$ can then be used in subsequent reactions, for example, hydrocarbon fuel synthesis and geological sequestration.

In an embodiment, a high-pressure electrodialysis apparatus can regenerate $CO_2$ gas from aqueous post-capture solutions at any pressure between the ambient pressure, for example 1 atm, and the internal operating pressure, or stack pressure, of the electrodialysis apparatus itself. In cases where the operating pressure and temperature result in gaseous $CO_2$ dissolved in solution after the electrodialytic ion transfer, the $CO_2$ regeneration is performed by a gas/liquid separation of the $CO_2$ from the solvent. In cases where the operating pressure and temperature result in a solution/liquid $CO_2$ or solution/supercritical $CO_2$ mixture after the electrodialytic ion transfer, the $CO_2$ regeneration is performed by high-pressure electrodialysis followed by a liquid/liquid or liquid/supercritical fluid separation of the $CO_2$ from the solvent. Embodiments of the apparatus are capable of taking as input an aqueous post-capture solution and emitting as output a stream of pure or nearly pure $CO_2$ gas at an elevated pressure required for, for example, efficient liquid hydrocarbon fuel synthesis or geological sequestration.

Currently available bipolar membrane electrodialysis (BPMED) apparatuses include an electrodialysis stack made up of at least one electrodialysis cell. The electrodialysis cell includes at least one bipolar membrane (BPM) such that, when an electrical potential is applied across the cell, the dissociation of water into hydrogen ($H^+$) and hydroxide ($OH^-$) ions occurs.

A BPM is formed from a cation-exchange layer laminated together with an anion-exchange layer, as well as a junction layer between the cation and anion layers. Water diffuses into the junction layer, reaching the usual equilibrium with $H^+$ and $OH^-$ ions according to its dissociation constant. Typically, a BPM is oriented such that the anion-exchange layer faces the anode (positive electrode) end of the BPMED apparatus and the cation-exchange layer faces the cathode (negative electrode) end of the apparatus. This orientation allows the $OH^-$ ions to be transported across the anion-exchange layer and the $H^+$ anions to be transported across the cation-exchange layer when an electrical potential is applied across the membrane stack. Simultaneously, the constituent cations and anions of an input salt solution are separated under the applied electrical potential via ion exchange membranes—either anion exchange membranes (AEMs), cation exchange membranes (CEMs), or some combination of the two. The $OH^-$ ($H^+$) ions "produced" by the BPM then combine with the cations (anions) separated from the input salt solution to produce basic (acidic) output solutions containing the parent acid and base of the input salt. Depending on the membrane configuration, a diluted salt solution may also be produced as output in addition to the acid and base output solutions.

A BPMED membrane stack can have either a two-compartment or a three-compartment configuration. In a two-compartment configuration, adjacent membranes may alternate between BPM and AEM to form a membrane stack of the form BPM, AEM, BPM, AEM, etc.; or adjacent membranes may alternate between BPM and CEM to form a membrane stack of the form BPM, CEM, BPM, CEM, etc. In a three-compartment cell, adjacent membranes may cycle from BPM to AEM to CEM, forming a membrane stack of the form BPM, AEM, CEM, BPM, AEM, CEM, etc. Electrodialysis without bipolar membranes is also possible, and consists of a two-compartment configuration formed by an alternating series of AEM and CEM to form a membrane stack of the form AEM, CEM, AEM, CEM, AEM, etc.

As mentioned above, gas bubbles inside commercially available BPMED systems result in gas bubbles adjacent to the membrane surface that can block ion transport in this region and reduce the effective membrane surface area, resulting in increased resistance and localized "hot spots" of very high current density that lead to shortened membrane lifetimes. As a result, commonly used input and output solutions are selected so that they do not evolve significant quantities of gas inside the membrane stack at ambient pressure. This excludes an entire class of gas-evolving solutions from electrodialytic treatment.

In an embodiment, these challenges are overcome by operating an electrodialysis apparatus at high pressure, i.e., above ambient pressure. In an embodiment, the operating pressure is sufficiently high, given other process conditions, that a gas that would typically evolve out of solution into the membrane stack at ambient pressure instead remains dissolved in solution, preventing gas bubble evolution inside the membrane stack itself. In an embodiment, the pressure of the solution containing the dissolved gas can be reduced downstream of the membrane stack so that the dissolved gas evolves out of solution and can be collected for other uses, if desired. In an embodiment, the pressure to which the solution is reduced can be any pressure less than the operating pressure of the membrane stack. In this way, the gas can be evolved at pressures greater than ambient pressure, and can also be evolved at pressures less than ambient pressure, if desired. Electrodialysis apparatuses according to certain embodiments may allow, for example, for energy-efficient, high-rate concentration of $CO_2$ in a compact, reliable unit from the aqueous carbonate/bicarbonate capture solutions to pure or nearly pure $CO_2$ gas suitable, for example, to sequester, to incorporate into useful products, or to react with other inputs to synthesize liquid hydrocarbon fuels.

In cases where the operating pressure and temperature result in a gas/liquid output solution after the electrodialytic ion transfer, the gas regeneration is performed by a gas/liquid separation of the gas from the solvent. In cases where the operating pressure and temperature result in liquid/liquid or liquid/supercritical fluid output solution after the electrodialytic ion transfer, the regeneration is performed by a liquid/liquid or liquid/supercritical fluid separation of the liquid or supercritical fluid from the solvent.

In some embodiments, a gas is absorbed into aqueous solution at some pressure $p_{low}$. High-pressure electrodialysis is then performed on the solution, and then the same gas is regenerated at a pressure $p_{high}$ with $p_{high} > p_{low}$. In this way, the embodiments may be used as gas pressurization devices capable of replacing inefficient mechanical compressors.

In an embodiment, an electrodialysis apparatus is designed to operate at pressures greater than or equal to ambient pressure, ambient pressure being defined as the pressure naturally occurring in the environment surrounding the apparatus. At an elevation of sea-level, the ambient pressure is typically around 1 atm, or 101.325 kPa. For example, in an embodiment, the high-pressure electrodialysis apparatus can operate at pressures up to and including 20 atm. In an embodiment, the high-pressure electrodialysis apparatus can operate at pressures above 20 atm. Accordingly, in an embodiment a high-pressure electrodialysis system may include positive displacement pumps to achieve high pressure in a single stage, with accumulators to smooth the flow if needed. It may also include solution tanks designed to withstand pressures of 20 atm and greater, allowing the system to evolve gas at any pressure between the ambient pressure and the membrane stack operating pressure, as well as reducing pumping losses in all loops via external pressurization. In this manner, gas can be evolved such that the evolved gas itself is at a pressure above ambient pressure. Various types of gases may be produced in this manner, depending on the inputs into the system. As examples, $CO_2$ gas can be produced when aqueous carbonate or bicarbonate solutions are input into the system; $SO_2$ gas can be produced when aqueous sulfite or bisulfate solutions are input into the system and made more acidic via operation of the system; and $NH_3$ gas can be produced when aqueous ammonium solutions are input into the system and made more basic via operation of the system. Producing gases at pressures greater than ambient pressure can be advantageous for many possible uses of the separated gas. For example, $CO_2$ gas separated in this manner can be used in sequestration or reaction to liquid hydrocarbon fuel. The actual pressure in the evolution tanks can be controlled by a regulator. To prevent large pressure differentials from occurring across the membranes, potentially leading to membrane damage, the system can include closed-loop computer control of both flow and pressure.

High-Pressure Electrodialysis Apparatus

FIG. 1 shows an exploded view of a high-pressure electrodialysis apparatus according to an embodiment. The apparatus includes an electrodialysis stack 101. The electrodialysis stack 101 includes at least one electrodialysis cell 102, although the apparatus may be adapted to receive any number of electrodialysis cells 102.

In an embodiment, the electrodialysis cell 102 includes a first cell gasket 103 rotated to a first angle, a first ion exchange membrane 104, a second cell gasket 105 rotated to a second angle, and a second ion exchange membrane 106. The first and second ion exchange membranes 104 and 106 may be either bipolar membranes, anion exchange membranes, or cation exchange membranes, depending on the input solutions used and the desired output solution. The electrodialysis cell 102 may, but need not be, a two-compartment cell. For example, the electrodialysis cell 102 may be instead a three-compartment cell, such as the three-compartment cell shown in FIG. 12. One skilled in the art will recognize that whether a two- or three-compartment cell is used depends on the desired chemistry.

In the two-compartment cell 102 shown in FIG. 1, the first angle is the orientation that allows a first solution flowing into the apparatus at the anode end 116 (i.e., the electrode held at a positive potential relative to the other electrode), depicted by dashed line 118, to contact the surface of the membranes adjacent to cell gasket 103; the first angle also allows the first solution to flow out of the apparatus at the cathode end 117 (i.e., the electrode held at a negative potential relative to the other electrode), as depicted by dashed line 119. The second angle is the orientation that allows a second solution flowing into the apparatus at the anode end 116, depicted by dashed line 120, to contact the surface of the membranes adjacent to cell gasket 105; the second angle also allows the second solution to flow out of the apparatus at the cathode end 117, as depicted by dashed line 121. The flows of the first and second solutions may be reversed as desired.

For example, when cell gasket 103 is the first cell gasket of the first electrodialysis cell 102 in an electrodialysis stack 101, the first angle to which cell gasket 103 is rotated allows a first solution flowing into the apparatus (dashed line 118) through an inlet port (not shown) at the anode end 116 to contact the surface of end ion exchange membrane 112 and first ion exchange membrane 104; the first angle also allows the first solution to flow out of the apparatus (dashed line 119) through outlet port 107 at the cathode end 117. Correspondingly, the second angle to which cell gasket 105 is rotated allows a second solution flowing into the apparatus (dashed line 120) through an inlet port (not shown) at the anode end 116 to contact the surface of first ion exchange membrane 104 and second ion exchange membrane 106; the second angle also allows the second solution to flow out of the apparatus (dashed line 121) through outlet port 108 at the cathode end 117. Where cell gasket 103 is the first cell gasket of an n-cell electrodialysis cell 102 in an electrodialysis stack 101 with n>1 electrodialysis cells 102, the first angle to which cell gasket 103 is rotated allows solution flowing into the apparatus to contact the surface of the second ion exchange membrane 106 of the preceding electrodialysis cell 102 and the first ion exchange membrane 104 of the electrodialysis cell 102 to which gasket 103 belongs. In this way, cell gaskets 103 and 105 define separate solution-receiving compartments.

In an embodiment, the first and second solutions are flowed through the electrodialysis stack 101 via a series of apertures and cell gasket openings that are formed in the different elements of the stack. For example, in an embodiment where the electrodialysis stack 101 includes one two-compartment BPMED cell (for example, where membrane 104 is a bipolar membrane and membrane 106 is either an anion exchange membrane or a cation exchange membrane) interposed between two end ion exchange membranes 112 and 114 and two end gaskets 111 and 115, with an additional cell gasket 113 between the electrodialysis cell 102 and the second end ion exchange membrane 114, the following series of features, proceeding from the anode end 116 to the cathode end 117, align to form the first solution loop, as depicted by dashed lines 118 and 119: 1) two end gasket apertures 131 of the first end gasket 111, 2) two membrane apertures 132 of the first end ion exchange membrane 112, 3) the cell gasket opening 135 of the first cell gasket 103, 4) two membrane apertures 132 of the first ion exchange membrane 104, 5) two gasket apertures 133 of the second cell gasket 105, 6) two membrane apertures 132 of the second ion exchange membrane 106, 7) the cell gasket opening 135 of the additional cell gasket 113, 8) two membrane apertures 132 of the second end ion exchange membrane 114, and 9) two end gasket apertures 131 of the second end gasket 115. The following series of features, proceeding from the anode end 116 to the cathode end 117, align to form the second solution loop in the same stack, as depicted by dashed lines 120 and 121: 1) two end gasket apertures 131 of the first end gasket 111, 2) two membrane apertures 132 of the first end ion exchange membrane 112, 3) two gasket apertures 133 of the first cell gasket 103, 4) two membrane apertures 132 of the first ion exchange membrane 104, 5) the cell gasket opening 135 of the second cell gasket 105, 6) two membrane apertures 132 of the second ion exchange membrane 106, 7) two gasket apertures 133 of the additional cell gasket 113, 8) two membrane apertures 132 of the second end ion exchange membrane 114, and 9) two end gasket apertures 131 of the second end gasket 115. Similar alignments of features can be used in embodiments that use three-compartment BPMED cells or electrodialysis cells that do not employ bipolar membranes but only employ anion exchange membranes and cation exchange membranes.

In an embodiment, the first solution, the flow of which is represented by dashed lines 118 and 119, is a basic solution (pH>7) that is made more basic upon passing through the operating electrodialysis unit such that the compartment defined by the cell gasket opening 135 of cell gasket 103 is a basic solution-receiving compartment. The second solution, the flow of which is represented by dashed lines 120 and 121, is an acidic solution (pH<7) that is made more acidic upon passing through the operating electrodialysis unit such that the compartment defined by the cell gasket opening 135 of cell gasket 105 is an acidic solution-receiving compartment. It will be appreciated that the first solution can be an acidic and the second solution basic, depending on which solutions are flowed into which ports.

In an embodiment of a two-compartment cell, the first and second cell gaskets 103 and 105 alternate with the first and second ion exchange membranes 104 and 106 such that a first cell gasket-first ion exchange membrane-second cell gasket-second ion exchange membrane sandwich is formed. The first ion exchange membrane 104 is substantially interposed between the first and second cell gaskets 103 and 105, and the second cell gasket 105 is substantially interposed between the first and second ion exchange membranes 104 and 106.

In another embodiment, the electrodialysis cell is a three-compartment BPMED cell instead (see, example, FIG. 12), where each cell contains three membranes, one of which is a bipolar membrane, one of which is an anion exchange membrane, and one of which is a cation exchange membrane. The three-compartment cell includes a first cell gasket, a first ion exchange membrane, a second cell gasket, a second ion exchange membrane, a third cell gasket, and a third ion exchange membrane. The first cell gasket is rotated to a first angle such that a first solution flowed into the apparatus through an inlet port at the anode end 116 contacts the surface of the membranes adjacent to the first cell gasket. The first angle also allows the first solution to be flowed out of the apparatus through an outlet port at the cathode end 117. The second cell gasket is rotated to a second angle such that a second solution flowed into the apparatus through an inlet port at the anode end 116 contacts the surface of the membranes adjacent to the second cell gasket. The second angle also allows the second solution to be flowed out of the apparatus through an outlet port at the cathode end 117. The third cell gasket is rotated to a third angle such that a third solution flowed into the apparatus through an inlet port at the anode end 116 contacts the surface of the membranes adjacent to the third cell gasket. The third angle also allows the third solution to be flowed out of the apparatus through an outlet port at the cathode end 117. The flows of the first, second, and third solutions may be reversed as desired.

In an embodiment, the electrodialysis stack 101 includes only one three-compartment cell such that the first solution flowed into the apparatus and into the solution-receiving compartment of the first cell gasket contacts the surface of the end ion exchange membrane and the first ion exchange membrane of the cell; the second solution flowed into the apparatus and into the solution-receiving compartment of the second cell gasket contacts the surface of the first and second ion exchange membranes of the cell; and the third solution flowed into the apparatus and into the solution-receiving compartment of the third cell gasket contacts the surface of the second and third ion exchange membranes of the cell. In an embodiment, the electrodialysis stack 101 includes more than one three-compartment cell such that the first solution flowed into the apparatus and into the solution-receiving compartment of the first cell gasket of the nth cell contacts the surface of the third ion exchange membrane of the preceding cell and the first ion exchange membrane of the nth cell; the second solution flowed into the apparatus and into the solution-receiving compartment of the second cell gasket of the nth cell contacts the surface of the first and second ion exchange membranes of the nth cell; and the third solution flowed into the apparatus and into the solution-receiving compartment of the third cell gasket of the nth cell contacts the surface of the second and third ion exchange membranes of the nth cell. In this way, the first, second, and third cell gaskets define separate solution-receiving compartments.

In an embodiment of a three-compartment cell, the solution-receiving compartment of the first cell gasket receives a basic solution that is made more basic upon passing through the operating electrodialysis unit, the solution-receiving compartment of the second cell gasket receives a salt solution that is diluted upon passing through the operating electrodialysis unit, and the solution-receiving compartment of the third cell gasket receives an acidic solution that is made more acidic upon passing through the operating electrodialysis unit. However, it will be appreciated that what the first, second, and third solutions are depends on which solutions are flowed into which ports.

In an embodiment of a three-compartment cell, the first, second, and third cell gaskets alternate with the first, second, and third ion exchange membranes such that a first cell gasket-first ion exchange membrane-second cell gasket-second ion exchange membrane-third cell gasket-third ion exchange membrane sandwich is formed. The first ion exchange membrane is substantially interposed between the first and second cell gaskets, the second cell gasket is substantially interposed between the first and second ion exchange membranes, the second ion exchange membrane is substantially interposed between the second and third cell gaskets, and the third cell gasket is substantially interposed between the second and third ion exchange membranes.

In an embodiment of a cell—either a either two-compartment, three-compartment, or non-BPMED cell—spacers (not shown) are used to substantially fill the gasket openings of the end gaskets and the cell gaskets. For example, in a two-compartment cell, spacers are used to substantially fill the gasket openings 134 and 135 of the end gaskets 111 and 115 and cell gaskets 103, 105, and 113 respectively. The spacers may be, for example, polypropylene mesh, such as, for example, XN-4820 netting made by Industrial Netting. In an embodiment, the spacers are cut to a size that substantially fills the gasket openings. The spacers may have a thickness that is approximately the same thickness as the end gaskets 111 and 115 and cell gaskets 103, 105, and 113, for example, 0.031", and may have a nominal hole size of approximately 0.1" and an open percent of approximately 76%. The spacers prevent the ion exchange membranes 112, 104, 106, and 114 from touching each other. They also optimize the mass transport of ions to the adjacent membrane faces by distributing the flow of solutions across the adjacent membrane surfaces.

In an embodiment of a cell—either a either two-compartment BPMED, three-compartment BPMED, or an electrodialysis cell without a bipolar membrane—all of the cell gaskets of the cell, as well as the additional cell gasket, are substantially the same, both in material and in shape, size, and formation. Each cell gasket is rotated at an angle to its neighboring cell gaskets. For example, in a two-compartment cell, the first cell gasket 103 and second cell gasket 105 are rotated at substantially 90 degree angles to each other. The rotation axis may be defined by, for example, the axis passing straight through the middle of the cell gasket opening.

In an embodiment, the apparatus is a high-pressure two-compartment BPMED apparatus. The first ion exchange membrane 104 may be, for example, a bipolar exchange membrane (BPM), and the second ion exchange membrane 106 may be, for example, an anion exchange membrane (AEM). In another embodiment, the first ion exchange membrane 104 may be, for example, a BPM, and the second ion exchange membrane 106 may be, for example, a cation exchange membrane (CEM). In another embodiment, the apparatus is not a BPMED apparatus, but is an electrodialysis apparatus with no bipolar membranes; the first ion exchange membrane 104 may be, for example, an AEM, and the second ion exchange membrane 106 may be, for example, a CEM.

In an embodiment, the apparatus is a high-pressure three-compartment BPMED apparatus. The first ion exchange membrane may be, for example, a BPM; the second ion exchange membrane may be, for example, an AEM; and the third ion exchange membrane may be, for example, a CEM.

In an embodiment, the electrodialysis stack 101 also includes end gaskets 111 and 115 and end ion exchange membranes 112 and 114. End ion exchange membrane 112 is substantially interposed between the first cell gasket 103 of the first electrodialysis cell 102 and the end gasket 111. In an embodiment, the electrodialysis stack 101 also includes an additional cell gasket 113 such that the end ion exchange membrane 114 is substantially interposed between the additional cell gasket 113 and the end gasket 115. End gaskets 111 and 115 include end gasket openings 134 defined to receive an electrode solution that is flowed into and out of the apparatus. In an embodiment, the electrode solution is flowed into the apparatus at both the anode 116 and cathode 117 ends through inlet ports at each end, for example, port 109; received in the electrode solution-receiving compartments defined by end gaskets 111 and 115; flowed back out of the apparatus at both the anode 116 and cathode 117 ends through outlet ports at each end, for example, port 110; and recombined in an electrode solution receiving tank operatively connected to the apparatus such that electroneutrality of the electrode solution is preserved.

In an embodiment, the electrodialysis stack 101 has the following alignment of features proceeding from the anode end 116 to the cathode end 117 along an axial direction: 1) end gasket 111, 2) end ion exchange membrane 112, 3) first cell gasket 103, 4) first ion exchange membrane 104, 5) second cell gasket 105, 6) second ion exchange membrane 106, 7) additional cell gasket 113, 8) end ion exchange membrane 114, and 9) end gasket 115. The end ion exchange membranes 112 and 114 may be, for example, CEMs; the first ion exchange membrane 104 may be, for example, a BPM; and the second ion exchange membrane 106 may be, for example, an AEM.

In an embodiment, the electrodialysis stack 101 includes end gaskets 111 and 115 and end ion exchange membrane 112, but does not include end ion exchange membrane 114 and additional cell gasket 113. For example, in an electrodialysis stack with one two-compartment BPMED cell composed of one BPM and one AEM, the electrodialysis stack 101 would have the following alignment of features proceeding from the anode end 116 to the cathode end 117 along an axial direction: 1) end gasket 111, 2) end ion exchange membrane 112 (a CEM), 3) first cell gasket 103, 4) first ion exchange membrane 104 (a BPM), 5) second cell gasket 105, 6) second ion exchange membrane 106 (an AEM), and 7) end gasket 115.

In an embodiment that uses a single three-compartment cell, the electrodialysis stack 101 includes end gaskets 111 and 115 and end ion exchange membrane 112, but does not include end ion exchange membrane 114 and additional cell gasket 113. For example, the electrodialysis stack 101 may have the following alignment of features proceeding from the anode end 116 to the cathode end 117 along an axial direction: 1) end gasket 111, 2) end ion exchange membrane 112 (a CEM), 3) first cell gasket 103, 4) first ion exchange membrane 104 (a BPM), 5) second cell gasket 105, 6) second ion exchange membrane 106 (an AEM), 7) third cell gasket (see cell gasket 1205, FIG. 12), 8) third ion exchange membrane (see membrane 1206, FIG. 12) (a CEM), and 9) end gasket 115. It will be recognized that different variations of electrodialysis stacks 101 are possible, depending on the input solutions used and the desired output solution.

By including at least one electrodialysis cell 102 and, in an embodiment, end ion exchange membranes 112 and 114, the electrodialysis stack 101 is configured to perform an electrodialysis operation on a solution at a stack pressure at or above the ambient pressure surrounding the apparatus. The stack pressure is the internal operating pressure of the apparatus; it is any pressure equal to or greater than ambient pressure. In an embodiment, the stack pressure is determined by the pressure of the operating solutions, i.e., the electrode solution and the first, second, and any third solutions. For example, in an electrodialysis apparatus where an electrode solution and a first and second solution are flowed into the apparatus, the first, second, and electrode solutions are each pressurized to the same pressure; the stack pressure, then, is whatever pressure the first, second, and electrode solutions are pressurized to. Making the pressures of the operating solutions equal inside the membrane stack ensures no pressure differentials across the membranes. In another embodiment, the operating solutions may be at different pressures. In an embodiment, the stack pressure is a pressure between ambient pressure and 20 atm. In an embodiment, the stack pressure is a pressure greater than or equal to 20 atm.

For example, in an embodiment the electrodialysis stack 101 includes one or more two-compartment electrodiaysis cells 102 configured with a BPM and an AEM. An acidic solution is flowed into the apparatus at the anode end 116 through an acid inlet port (not shown), as depicted by dashed line 120. A basic "post-capture" carbonate/bicarbonate solution is also flowed into the apparatus at the anode end 116 through a base inlet port (not shown), as depicted by dashed line 118. The BPM(s) of the electrodialysis cell(s) 102 dissociate water under an applied voltage such that OH$^-$ ions are transported across the BPM toward the anode end 116 and H$^+$ ions are transported across the BPM toward the cathode end 117. $HCO_3^-$ or $CO_3^{(2-)}$ ions from the post-capture basic solution are transported across the AEM(s) toward the anode end 116 and into the acidic solution such that $CO_2$ gas is evolved from the acidic solution at sufficiently low pressures. It will be appreciated that other types of aqueous solutions may alternatively be used such that other types of gas are evolved. For example, $SO_2$ gas can be produced when aqueous sulfite or bisulfate solutions are input into the system and made more acidic via operation of the system, and $NH_3$ gas can be produced when aqueous ammonium solutions are input into the system and made more basic via the operation of the system.

In an embodiment for which gas is produced when the input solution is made more acidic (such as $CO_2$ from carbonate and bicarbonates and $SO_2$ from sulfites and bisulfites), the stack pressure, defined as the pressure of the electrodialysis stack 101, is kept sufficiently high given operating conditions such as, for example, input solution composition and current density, that gas does not evolve from the acid solution inside the apparatus but instead remains dissolved in the aqueous acid solution. In an embodiment, after the acid solution is flowed out of the apparatus, the pressure of the acid solution can be lowered to a sufficiently low pressure given the operating conditions that the gas evolves out of the acidic solution. In an embodiment, the electrodialysis system includes tanks pressurized at a tank pressure that is above ambient pressure but less than the stack pressure such that the evolved gas is itself at a pressure above ambient pressure. In an embodiment, $CO_2$ gas at a pressure above ambient pressure can be evolved. Producing $CO_2$ gas at pressures greater than ambient pressure can be advantageous for many possible uses of the separated $CO_2$ gas, including sequestration and reaction to liquid hydrocarbon fuel. The tank pressure may be any pressure above ambient pressure but less than the stack pressure. In an embodiment, the stack pressure is a pressure between 1 atm and 20 atm. In an embodiment, the stack pressure is equal to or greater than 20 atm.

The electrodialysis apparatus also includes a first electrode (not shown) at the anode end 116 and second electrode 122 at the cathode end 117 of the apparatus such that a voltage can be applied across the electrodialysis stack 101. The electrodialysis stack 101 is substantially interposed between the first electrode and second electrode 122. In an embodiment, the apparatus also includes a first electrode grate 123 interposed between the first electrode and the electrodialysis stack 101, and a second electrode grate (not shown) interposed between the second electrode 122 and the electrodialysis stack 101.

The electrodialysis apparatus also includes a housing comprising two axial support members 126 and 127 and two reinforcing members 124 and 125. In an embodiment, the first axial support member 126 and the second axial support member 127 are configured to be operatively connected together to form a cell chamber. The cell chamber receives the electrodialysis stack 101. The cell chamber also provides a "pressure basket" around the electrodialysis stack 101 when the apparatus is pressurized. In an embodiment, the first axial support member 126 includes at least one pressurization port 128 that communicates with the cell chamber such that a portion of an electrode solution flowed into the electrode chamber via electrode solution ports in the first axial support member 126 (not shown) is transmittable into a region of the cell chamber outside the electrodialysis stack 101.

In an embodiment, the axial support members 126 and 127 have bossed ports that pass through radiused port holes in the reinforcing members 124 and 125 to allow either first, second, or electrode solution, depending on the port, to enter and exit the electrodialysis apparatus. In embodiments that include one or more three-compartment BPMED cells, there is an additional bossed port and radiused port hole through which the third solution can enter and exit the apparatus. Because the bossed ports can be slid through the radiused port holes in the reinforcing members 124 and 125, assembly of the axial support members 126 and 127 to the reinforcing members 124 and 125 can be accomplished without welding. Further, the bossed ports allow solutions to pass through the reinforcing members 124 and 125 without contacting the reinforcing members 124 and 125 so that the reinforcing members 124 and 125 do not form part of the flow channel. This allows different materials to be used to form the axial support members 126 and 127 and the reinforcing members 124 and 125. For example, in an embodiment the axial support members 126 and 127 may be formed from PVC, whereas the reinforcing members 124 and 125 may be formed from 4340 steel. Because the bossed ports of the axial support members 126 and 127 allow fluids to pass through the reinforcing members 124 and 125 without contacting the reinforcing members 124 and 125, corrosion of the steel of the reinforcing members by the fluids is avoided. The bossed ports can be connected, via a seal such as a static o-ring face seal, with flange adapters 129 to which fluid pumping hoses may be attached.

In an embodiment, the apparatus also includes two stress reduction cylinders 130, each one attached to the outside face of one of the reinforcing members 124 and 125. In another embodiment, stress reduction cylinders 130 are not included.

Figure 2:
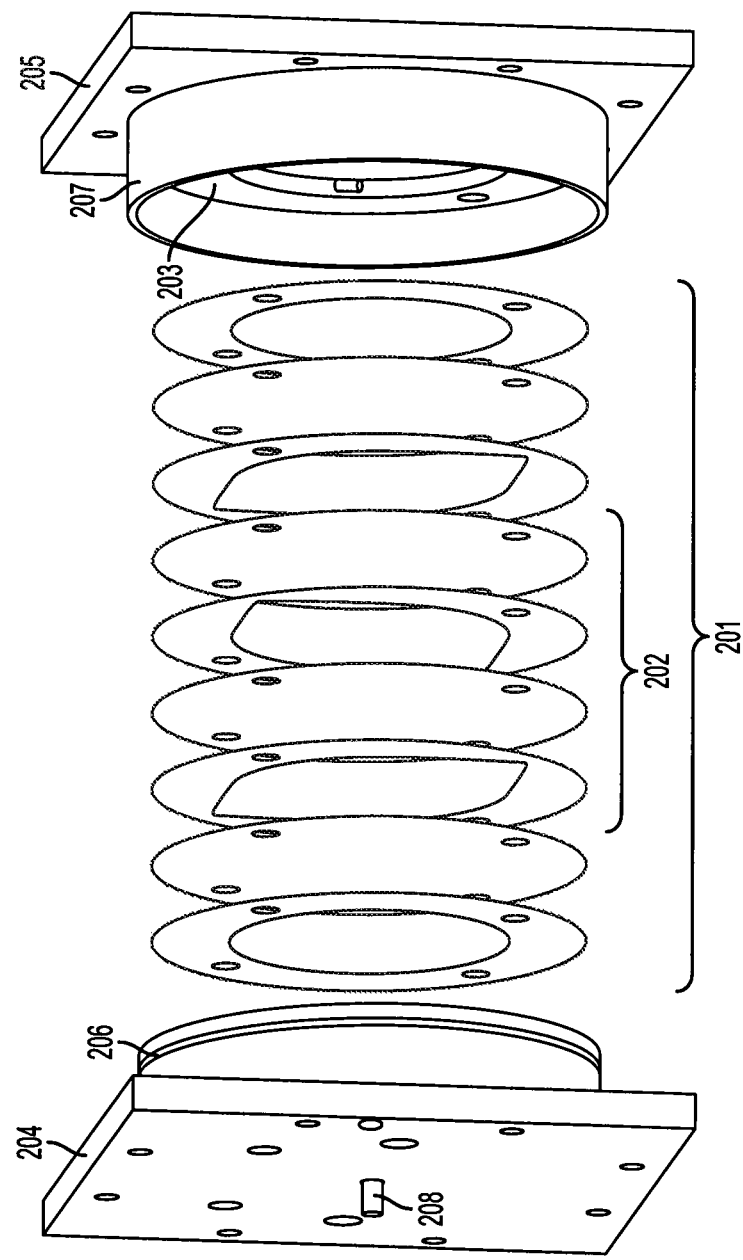
FIG. 2 is an exploded view of an embodiment of a high-pressure electrodialysis apparatus.

FIG. 2 shows an exploded view of another embodiment of a high-pressure electrodialysis apparatus. The housing includes two axial support members 203 (one not shown), two reinforcing members 204 and 205, and two sleeve members 206 and 207. The axial support members do not include protruding bosses for the ports. The axial support members are attached to the reinforcing members 204 and 205 by, for example, welding. The reinforcing members 204 and 205 have port holes that align with the ports of the axial support members such that the reinforcing members 204 and 205 form part of the flow channel. As such, the reinforcing members 204 and 205 need to be compatible with the reagents, i.e., made of a material that can withstand corrosion, for example, 316 stainless steel. Because stainless steel is not as strong as, for example, 4340 steel, the reinforcing members 204 and 205 may be thicker than reinforcing members made from other steels.

The axial support members may be operatively connected together by the sleeve members 206 and 207. The sleeve members 206 and 207 are a first cylinder and a second cylinder, respectively. In an embodiment, the first and second cylinders 206 and 207 are concentric steel cylinders with a sliding seal. The cylinders allow accommodation of an electrodialysis stack 201 with a varying number of cells 202 and provide a "pressure basket" around the gasketed membranes. This puts less stress on the gasket seals because pressure in the cell chamber is essentially the same as in the electrodialysis stack, the cell chamber pressure being supplied by a small diversion off one of the solution loops through a pressurization port.

The apparatus also includes an electrodialysis stack 201. The electrodialysis stack 201 may include one or electrodialysis cells 202, such as those described above with respect to FIG. 1. In an embodiment, the electrodialysis stack 201 includes one or more cells 202 configured to perform two-compartment BPMED. In another embodiment, the electrodialysis stack 201 includes one or more cells 202 configured to perform electrodialysis without bipolar membranes. In another embodiment, the electrodialysis stack 201 includes one or more cells 202 configured to perform three-compartment electrodialysis. Embodiments of electrodialysis stack 201 and electrodialysis cell 202 are substantially the same as embodiments of electrodialysis stack 101, described above with respect to FIG. 1. The apparatus also includes two electrodes 208 (one not shown), and, in an embodiment, two electrode grates (not shown).

The various features of the embodiment apparatuses discussed above with respect to FIGS. 1-2 will be discussed in more detail below with respect to FIGS. 3-15.

Figure 3:
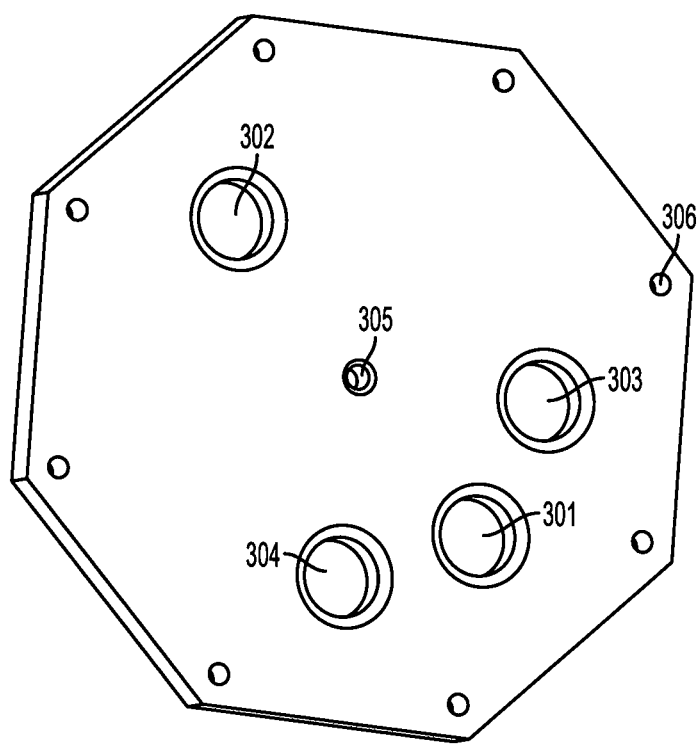
FIG. 3 is a front view of an interior face of a reinforcing member.

Turning to FIG. 3, a substantially planar view of the interior face of a first reinforcing member according to an embodiment is shown. The interior face of a second reinforcing member according to an embodiment is substantially the same except with respect to the relative positioning of the solution port holes. Therefore, the interior face of the second reinforcing member will not be separately discussed; differences will be noted below.

In an embodiment, the first reinforcing member includes electrode solution port holes 301 and 302 to allow the bossed electrode solution ports of the first axial support member (see FIG. 5) to pass through the first reinforcing member. In an embodiment where the ports of the first axial member are not bossed (see FIG. 2), the port holes 301 and 302 align with the electrode solution ports of the first axial support member instead. In an embodiment, electrode solution port hole 301 corresponds to an electrode solution inlet port of the first axial support member, and electrode solution port hole 302 corresponds to an electrode solution outlet port of the first axial support member. In an embodiment, electrode solution port hole 301 corresponds to an electrode solution outlet port of the first axial support member, and electrode solution port hole 302 corresponds to an electrode solution inlet port of the first axial support member.

In an embodiment, the electrode solution port holes 301 and 302 are formed in the first reinforcing member such that they are substantially directly across from each other. However, any other arrangement that allows for the bossed electrode solution ports of the first axial support member to pass through the first reinforcing member, or, in an alternative embodiment, for the electrode solution ports of the first axial support member to align, can be used. For example, in an embodiment first axial support member with bossed electrode solution ports not substantially directly across from each other, the electrode solution port holes 301 and 302 also would not be substantially directly across from each other. Instead, they would be formed in whatever positions correspond to where the bossed electrode solution ports are formed on the first axial support member.

The first reinforcing member also includes a first solution port hole 303 and a second solution port hole 304 to allow the bossed first and second solution ports of the first axial support member (see FIG. 5) to pass through the first reinforcing member. In an embodiment where the ports of the first axial member are not bossed (see FIG. 2), the port holes 303 and 304 align with the first and second solution ports of the first axial support member instead. In an embodiment, the first and second solution port holes 303 and 304 are formed substantially on either side of the electrode solution port hole 301. However, any other arrangement that allows for the bossed first and second solution ports of the first axial support member to pass through the first reinforcing member, or, in an alternative embodiment, for the electrode solution ports of the first axial support member to align, can be used. For example, in an embodiment first axial support member with bossed first and second solution ports not substantially on either side of the bossed electrode solution port that corresponds to the electrode solution port hole 301, the first and second solution port holes 303 and 304 also would not be substantially on either side of the electrode solution port hole 301. Instead, they would be formed in whatever positions correspond to where the bossed first and second solution ports are formed on the first axial support member. Further, it will be appreciated that the first and second solution port holes 303 and 304 may be in the opposite position relative to each other to that shown, i.e., the first solution port hole 303 could be instead formed where the second solution port hole 304 is formed, and vice versa.

In an embodiment, the first solution is an acidic solution and the second solution is a basic solution such that an acidic solution inlet port of the first axial support member passes through the first solution port hole 303, and a basic solution inlet port of the first axial support member passes through the second solution port hole 304. In another embodiment, the first solution is a basic solution and the second solution is an acidic solution such that a basic solution inlet port of the first axial support member passes through the first solution port hole 303, and an acidic solution inlet port of the first axial support member passes through the second solution port hole 304. The solution type (acidic or basic) that flows through the ports that pass through solution port holes 303 and 304 depends on the orientation of the cell gaskets (see FIG. 1) and the relative polarity of the electrodes (see FIG. 1) in the electrodialysis stack. For example, in an embodiment of the apparatus shown in FIG. 1 where 116 is the anode (relatively positive) end, the first ion exchange membrane 104 is a BPM, and the second ion exchange membrane 106 is an AEM, cell gasket 103 defines a base-receiving compartment and cell gasket 105 defines an acid-receiving compartment. The first solution would be an acidic solution such that the first solution port hole 303 would correspond to an acidic solution inlet port of the first axial support member of anode end 116, and the second solution would be a basic solution such that the second solution port hole 304 would correspond to a basic solution inlet port of the first axial support member of anode end 116. In an embodiment, the direction of the solution flow through the apparatus can be reversed, i.e., the solution inlet ports that pass through the first and second solution port holes 303 and 304 can become solution outlet ports instead, and the solution type associated with that port hole 303 or 304 will not change.

For the second reinforcing member (not shown) of an embodiment apparatus, the relative positions of the electrode solution port holes may be opposite to those shown in FIG. 3. For example, if the reinforcing member shown in FIG. 3 were a corresponding second reinforcing member instead, the electrode solution port hole 301 may correspond to an electrode solution outlet port on the second axial reinforcing member, and the electrode solution port hole 302 may correspond to an electrode solution inlet port on the second axial reinforcing member. However, it is not necessary that the relative positions of the electrode solution port holes of the first and second reinforcing members be opposite each other, and in some embodiments the positioning may be the same.

For the second reinforcing member (not shown) of an embodiment apparatus, the relative positions of the first and second solution port holes may be opposite to those shown in FIG. 3. For example, if the reinforcing member shown in FIG. 3 were a corresponding second reinforcing member instead, in an embodiment the first solution port hole 303 may correspond to a basic solution outlet port of the second axial reinforcing member, rather than an acidic solution inlet port like the first reinforcing member does. The second solution port hole 304 may correspond to an acidic solution outlet port of the second axial reinforcing member, rather than a basic solution inlet port like the first reinforcing member does.

In an embodiment of a high-pressure electrodialysis apparatus that uses one or more three-compartment BPMED cells, both the first and second reinforcing members include an additional, third solution port hole (not shown). The third solution port hole is formed in a position that corresponds with the third solution port of the corresponding axial support member. In an embodiment, the third solution may be, for example, a salt solution that is diluted upon passing through the operating electrodialysis unit.

The first reinforcing member also includes an electrode stem hole 305 to allow the stem of the first electrode to pass through the first reinforcing member. The electrode stem hole 305 may be formed, for example, substantially in the center of the first reinforcing member.

The first reinforcing member also includes at least one reinforcing member connection feature 306. The reinforcing member connection features 306 may be, for example, holes formed near the edges of the first reinforcing member and passing through the first reinforcing member such that a connecting feature (not shown) may be passed therethrough. The connecting feature may be, for example, dowel pins. Alternatively, a bolted connection may be used, for example, 10 mm, class 8.8 Hex head cap screws. A bolted connection has a safety factor of about 3.6 at a cell pressure of 20 atm, given the materials listed in previously described embodiments of the various elements of an apparatus. The reinforcing member connection features 306 allow the first reinforcing member to be coupled to the second reinforcing member in such a way that the first and second reinforcing members are substantially aligned adjacent to each other. When the first and second reinforcing members are so coupled, a compressive force is exerted along the axial direction, allowing the first and second axial support members to be mated, as will be discussed further with regard FIGS. 6-7.

Although the reinforcing member connection features 306 in FIG. 2 are depicted as holes, it will be appreciated that any shape that facilitates alignment and application of a compressive force can be used. Further, the reinforcing member connection features 306 may be formed substantially at the edges of the first reinforcing member, for example as notches, such that they are not enclosed on every side by the body of the first reinforcing member.

The reinforcing members provide strength to the electrodialysis apparatus. For example, when a stack pressure of 10 atm is applied to the apparatus, there is approximately 4.4 metric tons of force acting to push the apparatus apart in the axial direction. At a stack pressure of 20 atm, this doubles to nearly 9 metric tons (~20,000 lbf). In an embodiment, the reinforcing members are formed from high strength materials, for example 4340 steel, in order to withstand these pressures. In an embodiment, the reinforcing member is formed from 4340 chrome molybdenum steel in the annealed state that is approximately 0.75 inches thick and coated with a corrosion-inhibiting paint. In an embodiment, stress concentrations in the reinforcing members are reduced by radiusing the electrode solution port holes 301 and 302, the first and second solution port holes 303 and 304, and the electrode stem hole 305. In an embodiment, non-load bearing portions of the reinforcing members can be clipped to reduce the weight of the reinforcing member. In an embodiment, the mass of the assembled apparatus is approximately 35 kg.

Figure 4:
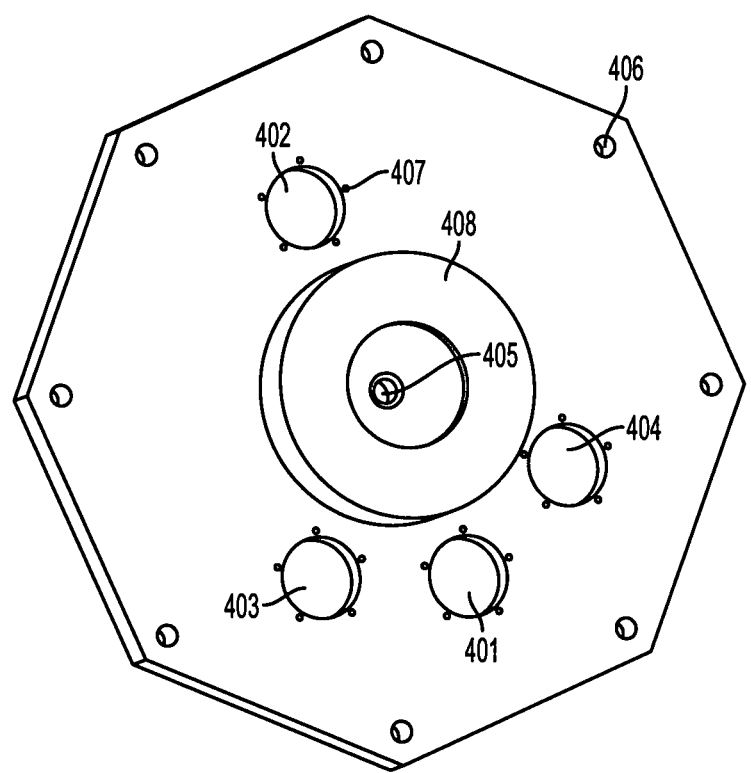
FIG. 4 is a front view of an exterior face of a reinforcing member.

FIG. 4 shows a substantially planar view of the exterior face of a first reinforcing member according to an embodiment. The planar view of the exterior face of a second reinforcing member according to an embodiment is substantially the same except with respect to the relative positioning of the solution port holes. Therefore, the exterior face of the second reinforcing member will not be separately discussed; differences will be noted below. Further, the elements 401-406 in FIG. 4 are the same as elements 301-306 in FIG. 3 except that they are the elements as seen from the exterior face, rather than the interior face, of a first reinforcing member. Therefore, elements 401-406 will not be discussed further except that differences will be noted below.

In an embodiment of a high-pressure electrodialysis apparatus that uses one or more three-compartment BPMED cells, both the first and second reinforcing members include an additional, third solution port hole (not shown) formed in a position that corresponds with the third solution port of the corresponding axial support member.

In an embodiment, the electrode solution port holes 401 and 402 and the first and second solution port holes 403 and 404 are not radiused on the exterior face of the first reinforcing member. In an embodiment, the electrode stem hole 405 is also not radiused on the exterior face of the first reinforcing member.

The first reinforcing member also includes at least one reinforcing member connection feature 406. In an embodiment, the first reinforcing member also includes a plurality of flange adapter mount holes 407 surrounding each port hole 401-404. In an embodiment, the flange adapter mount holes 407 are formed only on the exterior face of the first reinforcing member and do not pass through the first reinforcing members. The flange adapter mount holes 407 are formed in a number and an arrangement that substantially aligns with mount holes on the flange adapters themselves (not shown). Flange adapters are mounted over the port bosses of the axial support member (see FIG. 5) that protrude through the port holes of the reinforcing member when the axial support member and reinforcing member are coupled together. The flange adapter mount holes 407 allow the flange adapters (not shown) to be mounted over the protruding port bosses and attached to the first reinforcing member.

In an embodiment, the first reinforcing member includes a stress reduction cylinder 408. The stress reduction cylinder 408 may be attached to the first reinforcing member by, for example, welding. The stress reduction cylinder 408 is a capped cylinder provided to reduce stress on the reinforcing members when the electrodialysis apparatus operates at a pressure above ambient pressure.

For example, a simulated stress analysis was conducted using Solidworks FEA simulation tool. A reinforcing member formed from 4340 steel in the annealed state with a yield strength of approximately 4640 atm (68,200) psi was used. Pressure was applied to the interior face of the reinforcing member where the axial support member contacts the reinforcing member. Fixed restraints were placed at the reinforcing member connection features. Because a fixed restraint was used, the simulation showed higher stresses at these points than would be experienced with, for example, a bolted connection; stress oddities at these locations may be interpreted as a modeling artifact. Stress at both 10 atm (~150 psi) and 20 atm (~300 psi) was considered. The maximum stress was always near the electrode stem hole.

The simulation was run both with and without a stress reduction cylinder attached to the reinforcing member. At 10 atm (~150 psi), the stress near the electrode stem hole in the simulation with the stress reduction cylinder was approximately 530 atm (7800 psi), with a yield safety of 8.7; the deflection near the electrode stem hole was 0.15 mm. For the simulation without the stress reduction cylinder at 10 atm, the stress near the electrode stem hole was approximately 676 atm (9935 psi), with a yield safety of 6.86; the deflection near the electrode stem hole was 0.175 mm. At 20 atm (300 psi), the stress near the electrode stem hole in the simulation with the stress reduction cylinder was approximately 1536 atm (22,580 psi), with a yield safety of 3; the deflection near the electrode stem hole was 0.31 mm. For the simulation without the stress reduction cylinder at 20 atm, the stress near the electrode stem hold was approximately 1878 atm (27,600 psi), with a yield safety of 2.5; the deflection near the electrode stem hole was 0.35 mm.

Because the yield safety factor without the stress reduction cylinder is still 2.5 at 20 atm, embodiments that do not include the stress reduction cylinder 408 can be used up to pressures of around 20 atm. Embodiments that do use a stress reduction cylinder will allow operation at pressures greater than 20 atm, depending on the materials used for the various parts of the apparatus. Other embodiments may not include the stress reduction cylinder 408 but still be capable of operating above 20 atm, depending on the materials used for the various parts of the apparatus. In some instances, not including a stress reduction cylinder 408 avoids having to weld the stress reduction cylinder 408 to the reinforcing member, which avoids delay during preheating, cooling, and heat treatment. In some instances, this also avoids possible warpage, avoiding the need for additional corrective work.

Although the simulation only considered pressures of 10 atm and 20 atm, in an embodiment the reinforcing members are designed to withstand stack pressures greater than 20 atm.

It will be appreciated that any stack pressure, including pressures above 20 atm, can be used so long as the yield safety factor is sufficiently high. For example, a yield safety factor of at least 2 may be sufficient, depending on operating solutions and conditions.

Although the embodiment first reinforcing members shown in FIGS. 3-4 are substantially octagonal in shape, it will be appreciated that other shapes may be used for both the first and second reinforcing members. For example, the first and second reinforcing members may be substantially rectangular in shape, such as a square, or rounded, such as a circle.

Figure 5:
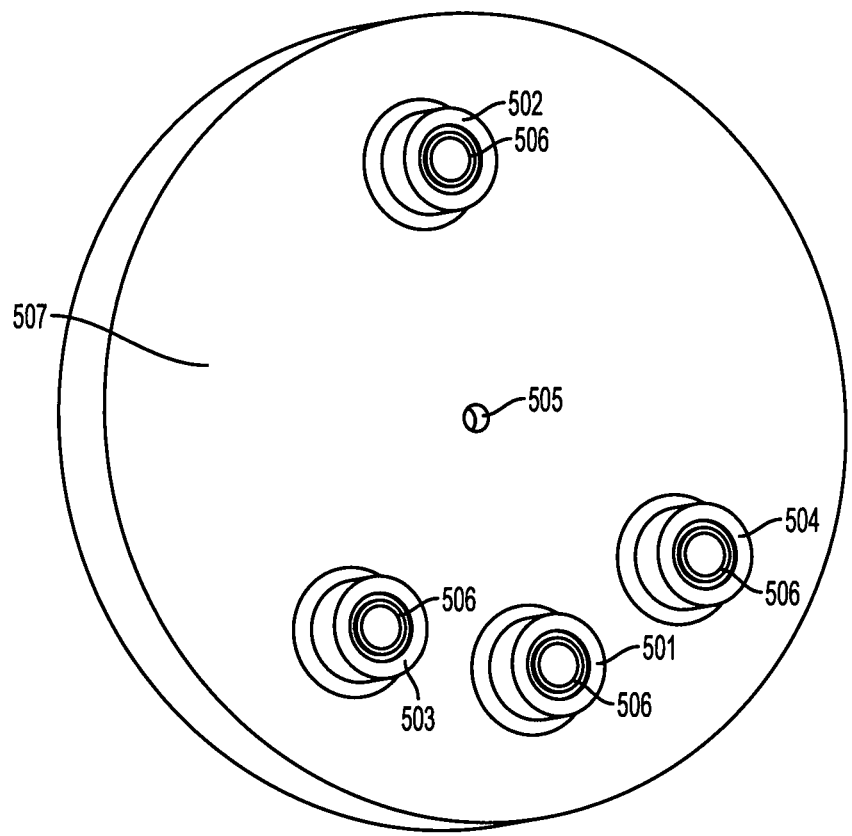
FIG. 5 is a front view of an exterior face of a first axial support member.

Turning to FIG. 5, a substantially planar view of the exterior face of a first axial support member according to one embodiment is shown. The planar view of the exterior face of a second axial support member according to one embodiment is substantially the same except with respect to the relative positioning and characterization of the solution ports. Therefore, the exterior face of the second reinforcing member will not be separately discussed; differences will be noted below.

In an embodiment, the first axial support member includes electrode solution ports 501 and 502. The electrode solution ports 501 and 502 allow the electrode solution to enter and exit the apparatus. The electrode solution may be, for example, an aqueous KOH or NaOH solution. In an embodiment, the electrode solution ports 501 and 502 are bossed, i.e., they protrude from the exterior face of the first axial support member. This allows the electrode solution ports 501 and 502 to pass through the first reinforcing member (see FIGS. 3-4). In an embodiment, electrode solution port 501 is an electrode solution inlet port, and electrode solution port 502 is an electrode solution outlet port. In an embodiment, electrode solution port 501 is an electrode solution outlet port, and electrode solution port 502 is an electrode solution inlet port. In an embodiment, the electrode solution ports 501 and 502 are formed in the first axial support member such that they are substantially directly across from each other. However, any other arrangement can be used, so long as the electrode solution port holes of the first reinforcing member (see FIGS. 3-4) are formed in positions that substantially align with the electrode solution ports 501-502.

For the second axial support member (not shown) of an embodiment apparatus, the relative positions of the electrode solution ports may be opposite to those shown in FIG. 5. For example, if the axial support member shown in FIG. 5 were a corresponding second axial support member instead, the electrode solution port 501 may be an electrode solution outlet port, and the electrode solution port 502 may be an electrode solution inlet port. However, it is not necessary that the relative positions of the electrode solution ports of the first and second reinforcing members be opposite each other, and in some embodiments the positioning may be the same.

The first axial support member also includes a first solution port 503 and a second solution port 504. The first solution port 503 of the first axial support member may be a first solution inlet, allowing the first solution to enter the apparatus; the first solution port of the second axial support member may be a first solution outlet, allowing the first solution to exit the apparatus. If the flow of the apparatus is reversed, the first solution port 503 of the first axial support member may instead be a first solution outlet, and the first solution port of the second axial support member may instead be a first solution inlet. The second solution port 504 of the first axial support member may be a second solution inlet, allowing the second solution to enter the apparatus; the second solution port of the second axial support member may be a second solution outlet, allowing the second solution to exit the apparatus. If the flow of the apparatus is reversed, the second solution port 504 of the first axial support member may instead be a second solution outlet, and the second solution port of the second axial support member may instead be a second solution inlet.

In an embodiment, the first solution is an acidic solution and the second solution is a basic solution such that an acidic solution passes through the first solution port 503 and a basic solution passes through the second solution port 504 of the first axial support member. In another embodiment, the first solution is a basic solution and the second solution is an acidic solution such that a basic solution passes through the first solution port 503 and an acidic solution passes through the second solution port 504 of the first axial support member. The solution type (acidic or basic) that flows through the ports 503 and 504 depends on the orientation of the cell gaskets, the ordering of the membranes, and the relative polarity of the electrodes in the electrodialysis stack (see FIG. 1). For example, in an embodiment of the apparatus shown in FIG. 1 where the first ion exchange membrane 104 is a BPM and the second ion exchange membrane 106 is an AEM such that cell gasket 103 defines a base-receiving compartment and cell gasket 105 defines an acid-receiving compartment, the first solution would be an acidic solution such that the first solution port 503 would be an acidic solution inlet port on the first axial support member (or outlet port if the flow were reversed) of anode end 116, and the second solution would be a basic solution such that the second solution port 504 would be a basic solution inlet port on the first axial support member (or outlet port if the flow were reversed) of anode end 116.

The first and second solution ports 503 and 504, as well as the first and second solution ports of the second axial support member, may be bossed, i.e., protrude from the exterior face of the support member. This allows the first and second solution ports 503 and 504 to pass through the reinforcing member (see FIGS. 3-4). In an embodiment, the first and second solution ports 503 and 504 are formed substantially on either side of the electrode solution port 501. However, any other arrangement can be used, so long as it allows for the first and second solution ports 503 and 504 to substantially align with their corresponding membrane and gasket apertures (see FIG. 1) such that the first and second solutions flow through the apparatus, and so long as the first and second solution port holes of the first reinforcing member (see FIGS. 3-4) are formed in positions that substantially align with their respective first and second solution ports 503-504.

The bossed ports of the first axial support member create solution passageways such that the solutions pass through the first reinforcing member (see FIGS. 3-4) without contacting the first reinforcing member. This allows the first axial support member and the first reinforcing member to be formed from different materials. For example, in an embodiment the first axial support member is formed from PVC for chemical compatibility with the working solutions, whereas the first reinforcing member is formed from steel, for example 4340 steel, for strength. This avoids contact by potentially corrosive solutions with the first reinforcing member. Further, this allows the first reinforcing member to be thinner than it might otherwise be. For example, a first reinforcing member made of PVC may have to be very thick to withstand the sorts of pressures an embodiment electrodialysis apparatus may operate under (4.4 metric tons of force in the axial direction at 10 atm, nearly 9 metric tons at 20 atm). In contrast, an embodiment first axial support member formed from, for example, 4340 chrome molybdenum steel can be thinner than it would be if made from PVC, for example, approximately 0.75 inches thick for operation up to 20 atm with a safety factor of 2.5 without use of a stress reduction cylinder.

For the second axial support member (not shown) of an embodiment apparatus, the relative positions of the first and second solution ports may be opposite to those shown in FIG. 5. For example, if the axial support member shown in FIG. 5 were a corresponding second axial support member instead, in an embodiment the first solution port 503 may be a basic solution outlet port, rather than an acidic solution inlet port like in the first axial support member does. If the flow were reversed, first solution port 503 may be a basic solution inlet port. The second solution port 504 may be an acidic solution outlet port, rather than a basic solution inlet port like in the first reinforcing member. If the flow were reversed, second solution port 504 may be an acidic solution inlet port.

In an embodiment of a high-pressure electrodialysis apparatus that uses one or more three-compartment BPMED cells, both the first and second axial support members include an additional, third solution port (not shown). The third solution port is formed in a position that corresponds with the third solution port hole of the corresponding reinforcing member. In an embodiment, the third solution may be, for example, a salt solution that is diluted upon passing through the operating electrodialysis unit. The third solution port allows a third solution to enter or exit the apparatus, depending on the direction of the flow.

The first axial support member also includes an electrode stem hole 505 to allow the stem of the first electrode to pass through the first axial support member. The electrode stem hole 505 may be formed, for example, substantially in the center of the first axial support member.

In an embodiment, the first axial support member also includes seals 506. The seals 506 aid the connection of the flange adapters (not shown) to the ports 501-504 of the first axial support member. In an embodiment, the seals may be received in a groove formed in the outer face of the port boss. In another embodiment, the seal may not be received in a groove. In an embodiment, each port 501-504 has a seal 506. The seal 506 may be, for example, a Viton® fluoroelastomer o-ring.

The first axial support member also includes a first reinforcing member contact area 507. The first reinforcing member contact area 507 comes substantially in contact with the interior face of the first reinforcing member (see FIG. 3) when the electrodialysis apparatus is assembled.

Figure 6:
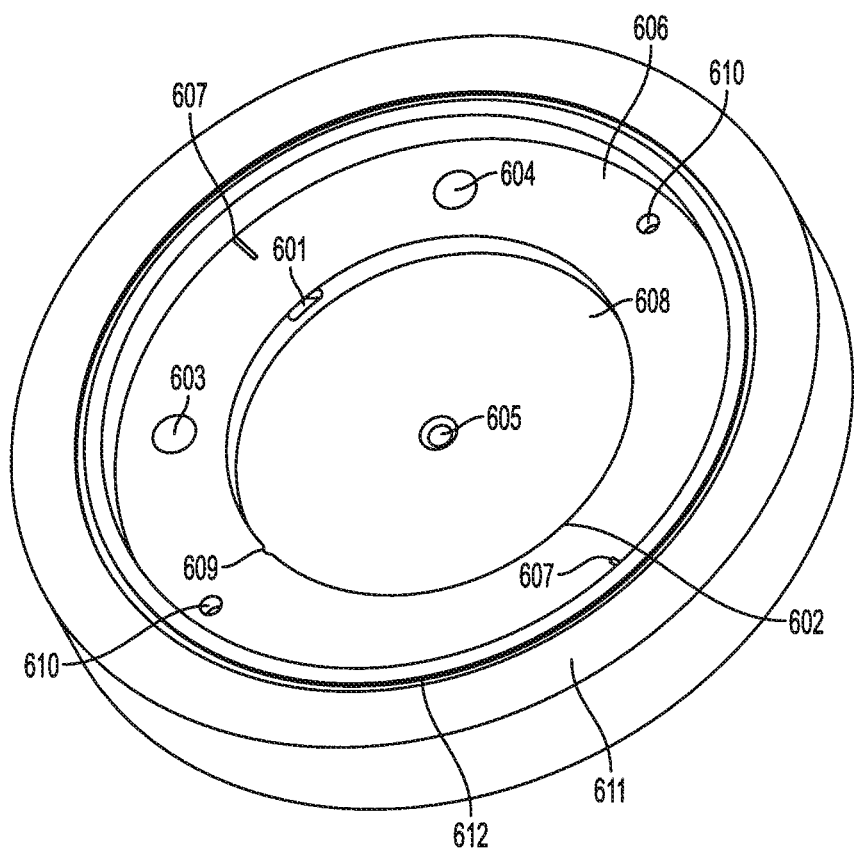
FIG. 6 is a front view of an interior face of a first axial support member.

FIG. 6 shows a substantially planar view of the interior face of a first axial support member according to one embodiment. In an embodiment, the planar view of the interior face of the second axial support member is not substantially the same. The interior face of the second axial support member will be discussed below with respect to FIG. 7. The elements 601-605 in FIG. 6 are the same as elements 501-505 in FIG. 5 except that they are the elements as seen from the interior face, rather than the exterior face, of the first axial support member.

The first axial support member includes electrode solution ports 601 and 602. Although electrode solution port 602 is obscured in FIG. 6, it will be appreciated that in an embodiment, electrode solution port 602 is substantially the same configuration as electrode solution port 601. The electrode solution ports 601 and 602 allow the electrode solution to enter and exit the apparatus. In an embodiment, the electrode solution ports 601 and 602 are formed in the first axial support member such that they are substantially directly across from each other. However, any other arrangement can be used, so long as the electrode solution port holes of the first reinforcing member (see FIGS. 3-4) are formed in positions that substantially align with their respective electrode solution ports 601-602.

In an embodiment, the electrode solution inlet and outlet ports 601 and 602 do not pass straight through the entire thickness of the first axial support member. Rather, the electrode solution ports 601 and 602 pass from the exterior side (see FIG. 5) substantially straight through only part of the thickness of the first axial support member, stopping short of the cell recess 606, forming a "blind" hole at each port. From there, an angled, oval-shaped port passes from each blind hole to the cell chamber, such that the electrode solution ports 601 and 602 open onto the first electrode recess 608. In this manner, the electrode solution is allowed to flow into the apparatus through one of the electrode solution ports and across the electrode (not shown). When the electrode solution exits the apparatus, it flows across the electrode, through the angled portion of the other electrode solution port, and then through the straight portion of that solution port and out of the apparatus. In an embodiment, electrode solution port 601 is an electrode solution inlet port, and electrode solution port 602 is an electrode solution outlet port. In an embodiment, electrode solution port 601 is an electrode solution outlet port, and electrode solution port 602 is an electrode solution inlet port. Although an oval-shaped port is shown, it will be appreciated that any opening shape may be used. Further, it will be appreciated that any depth short of the depth of the cell recess 606, including up to the cell recess 606 depth itself, may be used, such that any angle formed as a result of the selected depth may be used.

The first axial support member also includes first and second solution ports 603 and 604. In an embodiment, the first solution port 603 is an acidic solution inlet, allowing acidic solution to enter the apparatus, and the second solution port 604 is a basic solution inlet, allowing basic solution to enter the apparatus. In an embodiment, the first solution port 603 is a basic solution inlet, allowing basic solution to enter the apparatus, and the second solution port 604 is an acidic solution inlet, allowing acidic solution to enter the apparatus. In both embodiments, the solution flow can be reversed such that first and second solution ports 603 and 604 become solution outlets, allowing acidic and basic solutions to flow out of the apparatus. In an embodiment, the first and second solution ports 603 and 604 are formed substantially on either side of the electrode solution port 601. However, any other arrangement can be used, so long as it allows for the first and second solution ports 603 and 604 to substantially align with their corresponding membrane apertures in the ion exchange membranes (see FIG. 1) such that first and second solutions flow through the apparatus.

In an embodiment of a high-pressure electrodialysis apparatus that uses one or more three-compartment BPMED cells, the first axial support members include an additional, third solution port (not shown). The third solution port is formed in a position that corresponds with the third solution port hole of the corresponding reinforcing member. In an embodiment, the third solution may be, for example, a salt solution that is diluted upon passing through the operating electrodialysis unit. The third solution port allows a third solution to enter or exit the apparatus, depending on the direction of the flow.

The first axial support member also includes an electrode stem hole 605 to allow the stem of the first electrode to pass through the first axial support member. The electrode stem hole 605 may be formed, for example, substantially in the center of the first axial support member.

In an embodiment, the first axial support member also includes a cell recess 606 configured to receive the electrodialysis stack. In an embodiment, the cell recess 606 is formed within the first axial support member such that the cell recess 606 has a smaller size than the first axial support member, for example, a smaller diameter. The cell recess 606 is also formed within the first axial support member such that the cell recess 606 has a larger size than the electrodialysis stack, for example, a larger diameter. In this way, a gap is created at the perimeter of the cell recess 606 such that when the first axial support member and the second axial support member are mated to form the cell chamber, the electrodialysis stack does not come into contact with the interior side walls of the cell chamber so that a gap between the stack and the cell chamber side walls exists. This gap may be any size.

In an embodiment, the first axial support member also includes one or more pressurization ports 607. The pressurization ports 607 may be formed, for example, substantially at the perimeter of the cell recess 606. The pressurization ports 607 allow the pressure between the interior of the electrodialysis stack and the cell chamber to equalize by diverting a portion of the electrode solution into the gap between the electrodialysis stack and the interior cell chamber walls, i.e., the region of the cell chamber outside the electrodialysis stack. In this way, a "pressure basket" is formed around the electrodialysis stack. In an embodiment, the diverted portion of the electrode solution may be a negligible fraction of the total electrode solution volume. The pressurization ports 607 may be formed such that they are directly connected to the electrode solution ports 601 and 602, for example, by machining a bleed hole from each of the ports 601 and 602. In this way, the electrode solution ports 601 and 602 can be connected to the gap between the electrodialysis stack and the interior cell chamber wall, allowing the electrode solution ports 601 and 602 to communicate with the cell chamber by transmitting a portion of the electrode solution into the gap.

In an embodiment, the first axial support member also includes a first electrode recess 608 configured to receive the first electrode (not shown). In an embodiment, the first electrode recess 608 is also configured to receive the first electrode grate (see FIGS. 9-10). The first electrode recess 608 is formed within the first axial support member such that the first electrode recess 608 lies substantially within the cell recess 606. In an embodiment, the first electrode recess 608 is deeper than the cell recess 606. In an embodiment, the electrode stem hole 605 is formed substantially in the center of the first electrode recess 608 such that the electrode stem passes through the first axial support member and out the exterior side of the first axial support member when the electrode (not shown) is received in the first electrode recess 608. In an embodiment, the electrode rests within the first electrode recess 608 such that a space is created between the face of the electrode active surface disk and the electrodialysis cell. In an embodiment, the electrode grate also rests within the first electrode recess 608 and is positioned substantially on top of the face of the electrode active surface disk. In an embodiment, the first electrode recess 608 is formed to a depth deep enough to receive both the electrode and the electrode grate such that the face of the electrode grate is substantially planar with the face of the cell recess 606 when the electrode and electrode grate are received in the first electrode recess 608.

In an embodiment, the first electrode recess 608 includes one or more first electrode recess alignment features 609. The first electrode recess alignment feature 609 may be, for example, a notch formed in the perimeter of the first electrode recess 608. The first electrode recess alignment feature 609 allows the first electrode grate (see FIGS. 9-10) to be aligned in the first electrode recess 608. For example, an embodiment first electrode grate may have an electrode grate alignment feature that is a nib formed substantially on the outer perimeter of the grate's spacing rim; the first electrode recess alignment feature 609 may be a groove of corresponding size to the nib such that the nib fits substantially within the groove when the electrode grate is received in the first electrode recess 608. Aligning the electrode grate in the first electrode grate recess 608 facilitates alignment of the grate solution ports with the electrode solution ports 601 and 602. Although the embodiment first electrode recess 608 shown in FIG. 6 has only one first electrode recess alignment feature 609, it will be appreciated that any number of first electrode recess alignment features 609 may be used.

In an embodiment, the first axial support member also includes one or more support member alignment features 610. The support member alignment features 610 may be formed substantially near the perimeter of the cell recess 606. The support member alignment features 610 correspond to support member alignment features in the second axial support member, as well as to alignment features in the membranes and gaskets of the electrodialysis stack. The support member alignment features 610 allow the first axial support member, the second axial support member, and the membranes and gaskets of the electrodialysis stack to be aligned. Aligning features, for example pins, are placed in the support member alignment features 610 to facilitate alignment of the support members and electrodialysis stack. In an embodiment, the aligning features may be, for example, stainless steel pins.

Although the support member alignment features 610 in FIG. 6 are depicted as holes, it will be appreciated that any shape that facilitates alignment can be used. Further, although the first axial support member shown in FIG. 6 has two support member alignment features 610, it will be appreciated that any number of support member alignment features 610 can be used.

The first axial support member also includes a mating face 611. In an embodiment, the mating face 611 has a groove formed within the mating face that receives a seal 612. In another embodiment, the mating face 611 may not have a groove for receiving the seal 612. The seal 612 may be, for example, a Viton® fluoroelastomer o-ring. The groove may be formed near the inner perimeter of the mating face 611 such that the seal 612 is located near the inner perimeter of the mating face 611. The seal 612 allows the mating face 611 to be selectively coupled to the mating face of the second axial support member such that the cell chamber is formed. In an embodiment, when the first and second axial support members are mated, the cell chamber has a depth such that when seven electrodialysis cells are used, there is approximately a 10% squeeze on the gaskets, ensuring good cell-to-cell and cell-to-chamber seal. In other embodiments, the squeeze on the gaskets may from 5% to 20%. To accommodate a lesser number of cells, appropriately thick "dummy" cells made, for example, from gasket material and spacer material or stainless steel and spacer material, may be used instead of an actual cell. The apparatus can be adapted to receive any number of cells, including more than seven cells.

Figure 7:
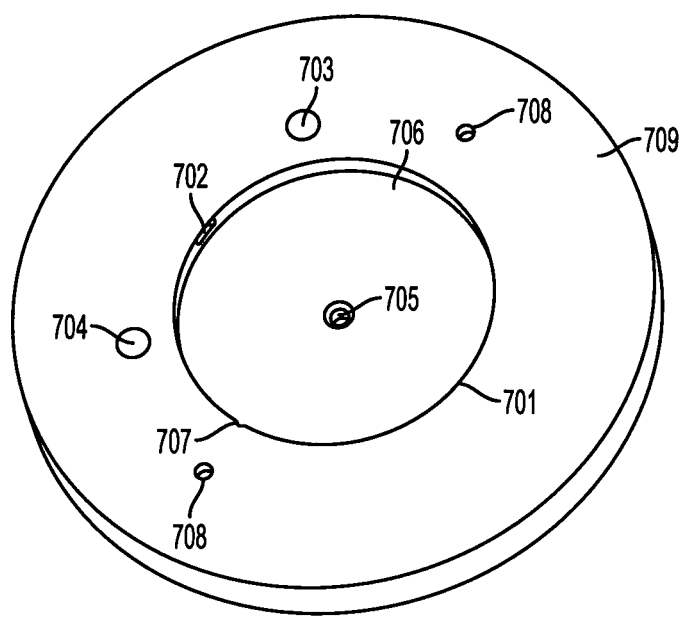
FIG. 7 is a front view of an interior face of a second axial support member.

FIG. 7 shows a substantially planar view of the interior face of a second axial support member according to an embodiment. The elements 701-705 in FIG. 7 are substantially the same as elements 601-605 in FIG. 6 except that they are elements of a second axial support member, rather than elements of a first axial support member. They are also substantially the same as elements 501-505 seen in FIG. 5 except that they are the elements as seen from the interior face, rather than the exterior face, of a second axial support member.

The second axial support member includes electrode solution ports 701 and 702. Although electrode solution port 701 is obscured in FIG. 7, it will be appreciated that in an embodiment, electrode solution port 701 is substantially the same configuration as electrode solution port 702. The electrode solution ports 701 and 702 allow the electrode solution to enter and exit the apparatus. In an embodiment, the electrode solution ports 701 and 702 are formed in the second axial support member such that they are substantially directly across from each other. However, any other arrangement can be used, so long as the electrode solution port holes of the second reinforcing member (see FIGS. 3-4) are formed in positions that substantially align with their respective electrode solution ports 701-702.

In an embodiment, the electrode solution ports 701 and 702 do not pass straight through the entire thickness of the second axial support member. Rather, the electrode solution ports 701 and 702 pass from the exterior side (see FIG. 5) substantially straight through only part of the thickness of the second axial support member, stopping short of the mating face 709, forming a "blind" hole at each port. From there, an angled oval-shaped port passes from each blind hole to the cell chamber, such that the electrode solution ports 701 and 702 open onto the second electrode recess 706. In this manner, electrode solution is allowed to flow into the apparatus through one of the electrode solution ports 701 and across the electrode (not shown). When the electrode solution exits the apparatus, it flows across the electrode, through the angled portion of the other electrode solution port, and then through the straight portion of that electrode solution port and out of the apparatus. In an embodiment, electrode solution port 701 is an electrode solution inlet port, and electrode solution port 702 is an electrode solution outlet port. In an embodiment, electrode solution port 701 is an electrode solution outlet port, and electrode solution port 702 is an electrode solution inlet port. Although an oval-shaped port is shown, it will be appreciated that any opening shape may be used. Further, it will be appreciated that any depth short of the depth of the mating face 709, including up to the mating face 709 depth itself, may be used, such that any angle formed as a result of the selected depth may be used.

The second axial support member also includes first and second solution ports 703 and 704. In an embodiment, the first solution port 703 is an acidic solution outlet, allowing acidic solution to exit the apparatus, and the second solution port 704 is a basic solution outlet, allowing basic solution to exit the apparatus. In an embodiment, the first solution port 703 is a basic outlet, allowing basic solution to exit the apparatus, and the second solution port 704 is an acidic solution outlet, allowing acidic solution to exit the apparatus. In both embodiments, the solution flow can be reversed such that first and second solution ports 703 and 704 become solution inlets, allowing acidic and basic solutions to flow into the apparatus. In an embodiment, the first and second solution ports 703 and 704 are formed substantially on either side of the electrode solution port 702. However, any other arrangement can be used so long as it allows for the first and second solution ports 703 and 704 to substantially align with their corresponding membrane apertures in the ion exchange membranes (see FIG. 1) such that first and second solutions flow through the apparatus.

In an embodiment of a high-pressure electrodialysis apparatus that uses one or more three-compartment BPMED cells, the second axial support members include an additional, third solution port (not shown). The third solution port is formed in a position that corresponds with the third solution port hole of the corresponding reinforcing member. In an embodiment, the third solution may be, for example, a salt solution that is diluted upon passing through the operating electrodialysis unit. The third solution port allows a third solution to enter or exit the apparatus, depending on the direction of the flow.

The second axial support member also includes an electrode stem hole 705 to allow the stem of the second electrode to pass through the second axial support member. The electrode stem hole 705 may be formed, for example, substantially in the center of the second axial support member.

In an embodiment, the second axial support member includes a second electrode recess 706 configured to receive the second electrode (not shown). In an embodiment, the second electrode recess 706 is also configured to receive the second electrode grate (not shown). The second electrode recess 706 is formed within the second axial support member such that the second electrode recess 706 lies substantially within the second axial support member. In an embodiment, the second electrode recess 706 is deeper than the mating face 709. In an embodiment, the electrode stem hole 705 is formed substantially in the center of the second electrode recess 706. In an embodiment, the electrode rests within the second electrode recess 706 such that a space is created between the electrode face and the electrodialysis cell. In an embodiment, the electrode grate also rests within the second electrode recess 706 and is positioned substantially on top of the electrode face. In an embodiment, the second electrode recess 706 is formed to a depth deep enough to receive both the electrode and the electrode grate such that the face of the electrode grate is substantially planar with the mating face 709 when the electrode and electrode grate are received in the second electrode recess 706.

In an embodiment, the second electrode recess 706 may also include one or more second electrode recess alignment features 707. The second electrode recess alignment feature 707 may be, for example, a notch formed in the perimeter of the second electrode recess 706. The second electrode recess alignment feature 707 allows the second electrode grate to be aligned in the second electrode recess 706. For example, an embodiment second electrode grate may have an electrode grate alignment feature that is a nib formed substantially on the outer perimeter of the electrode grate's spacing rim; the second electrode recess alignment feature 707 may be a groove of corresponding size to the nib such that the nib fits substantially within the groove when the electrode grate is received in the second electrode recess 706. Aligning the electrode grate in the second electrode recess 706 facilitates alignment of the grate solution ports with the electrode solution ports 701 and 702. Although the second electrode recess 706 shown in FIG. 7 only has one second electrode recess alignment feature 707, it will be appreciated that any number of second electrode recess alignment features 707 may be used.

In an embodiment, the second axial support member also includes one or more support member alignment features 708. The support member alignment features 708 may be formed substantially near the inner perimeter of the mating face 709. The support member alignment features 708 correspond to support member alignment features in the first axial support member, as well as alignment features in the membranes and gaskets of the electrodialysis stack. The support member alignment features 708 allow the first axial support member, the second axial support member, and the membranes and gaskets of the electrodialysis stack to be aligned. Aligning features, for example pins, may be placed in the support member alignment features 708 to facilitate alignment of the support members and electrodialysis stack. In an embodiment, the aligning features may be, for example, stainless steel pins.

Although the support member alignment features 708 in FIG. 7 are depicted as holes, it will be appreciated that any shape that facilitates alignment can be used. Further, although the second axial support member shown in FIG. 7 has two support member alignment features 708, it will be appreciated that any number of support member alignment features 708 can be used.

The second axial support member also includes a mating face 709. The mating face 709 can be selectively coupled to the mating face of the first axial support member via a seal received in a groove formed in the first axial support member (see FIG. 6). In an embodiment, the groove may be alternatively formed in the second axial support member such that the seal for selectively coupling the first and second axial support members is received in the second axial support member instead. In an embodiment, the seal may be attached to the second axial support member rather than the first axial support member, but not received in a groove.

In an embodiment, the second axial support member does not include a cell recess. In an embodiment, the second axial support member does not include a groove to receive a seal. In an embodiment, the second axial support member does not include at least one pressurization port.

In an embodiment, the first and second axial support members shown in FIGS. 5-7 may be formed from PVC. PVC has a tensile strength of approximately 400 atm (5900 psi). Since the reinforcing members provide support in the axial direction, the main issue for the axial support members is hoop stress in the cell chamber wall formed when the first and second axial support members are coupled together. As an example, Lame's thick walled cylinder equations applied to the wall of the first axial support member from the outside of the first axial support member (diameter 300 mm) to the outer wall of the groove (252.55 mm), at a pressure of 20 atm (300 psi), show a maximum hoop stress of approximately 118 atm (1760 psi), with a safety factor of 3.35. This is pessimistic because the first axial support member may only be this thin for the depth of the o-ring groove, and in reality would receive support from its neighboring thicker wall, and since the cylinder is shallow compared to its diameter, the back wall helps provide support as well.

A Solidworks FEA simulation for PVC was also conducted where pressure was applied to the entire interior, i.e., wetted surfaces of the cell chamber. A fixed restraint was placed at one of the solution inlet port faces, where the flange adapter seals, for example, with an o-ring. Because this is a fixed restraint, the simulation produced higher stresses at these points than would occur with an actual connection. A sliding restraint was used on the back and front sides sealing faces, since movement in the axial direction is constrained by the supporting members. At a simulated pressure of 10 atm (150 psi), the stress near the pressurization port of the first axial support member was approximately 43 atm (630 psi), with a safety factor of 9.36. At a simulated pressure of 20 atm (300 psi), stress near the pressurization port of the first axial support member was approximately 115 atm (1690 psi), with a safety factor of 3.49. These safety levels were deemed satisfactory.

Figure 8:
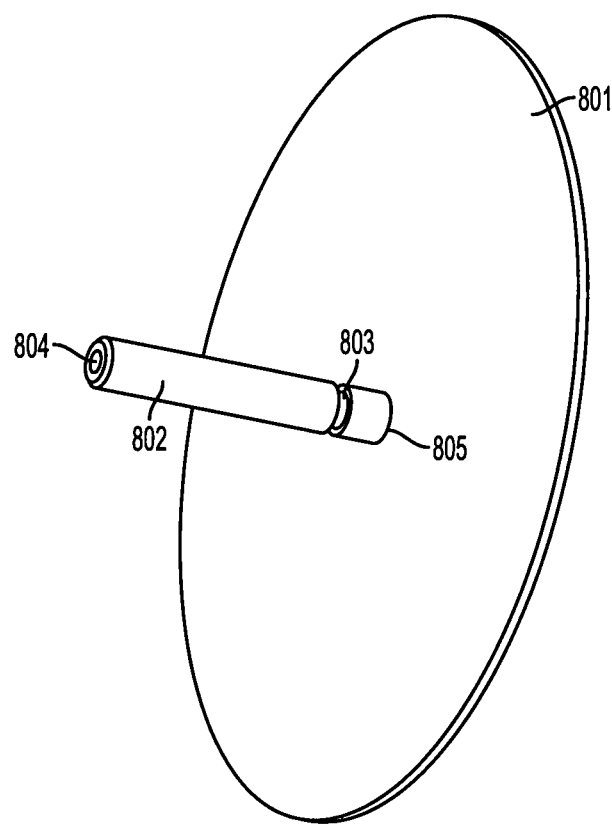
FIG. 8 shows an electrode.

FIG. 8 shows an exterior view of an electrode according to an embodiment. In an embodiment, first and second electrodes are substantially the same and are not discussed separately.

The electrode includes an active surface disk 801, the underside of which comes substantially in contact with the electrode grate recess (see FIGS. 6-7) when the electrode is received in the electrode grate recess. The electrode also includes an electrode stem 802. The electrode stem 802 passes through the axial support member from its interior side through the electrode stem hole (see FIGS. 6-7), where it may be sealed, for example, with a seal 803 such as a Viton® fluoroelastomer static male o-ring. The electrode stem 802 also passes through the reinforcing member from its interior side when the reinforcing member and axial support member are coupled together to form a housing section. The electrode stem 802 may have a groove to receive the seal 803. The electrode stem 802 allows electrical connection via the connector 804. The connector 804 may be, for example, a female banana plug style connector. In an embodiment, the electrode also includes a joint 805 where the electrode stem 802 is attached to the active surface disk 801. The electrode may be formed, for example, from nickel. In an embodiment, the electrode may be, for example, a Series 200 nickel electrode.

Figure 9:
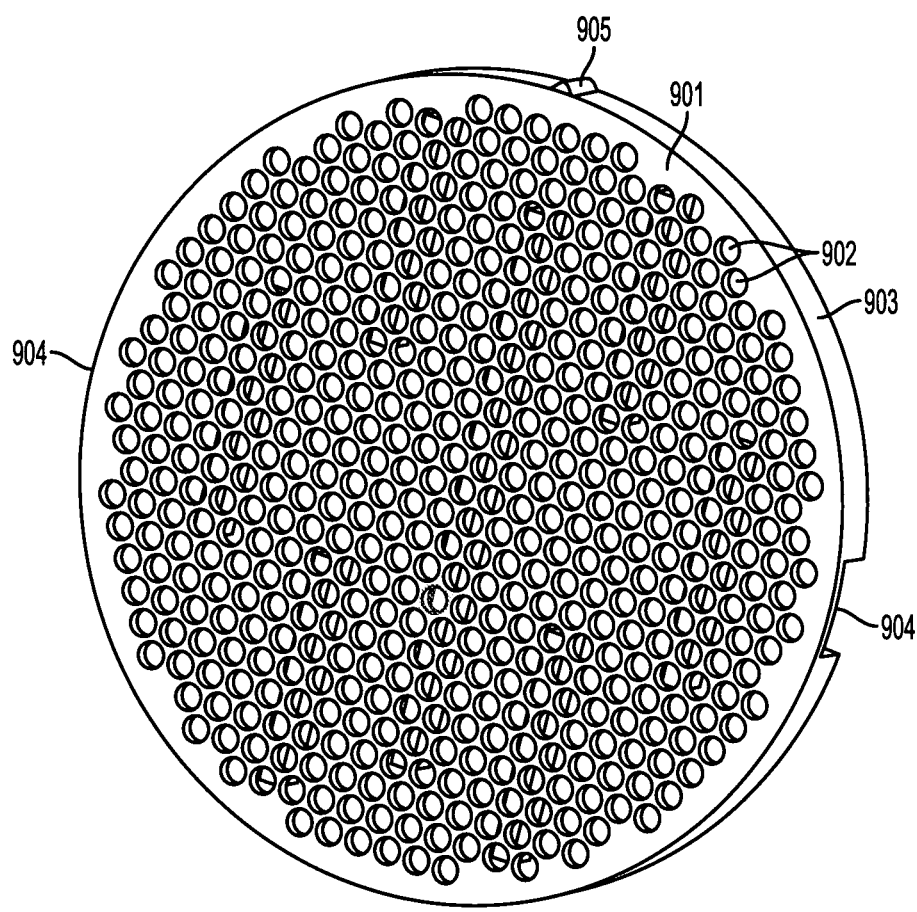
FIG. 9 is a front view of an interior face of an electrode grate.

FIG. 9 shows a substantially planar view of the interior face, i.e., the face that faces the interior of the cell chamber, of an electrode grate according to an embodiment. In an embodiment, the first and second electrode grates are substantially the same and are not discussed separately.

The electrode grate includes an electrode grate face 901. The interior face of the embodiment electrode grate faces the interior of the cell chamber such that the electrode grate face 901 faces the electrodialysis stack. The electrode grate face 901 includes a plurality of exposure apertures 902, which allow the electrode solution to flow through the electrode grate. Although the exposure apertures 902 shown in FIG. 9 are holes, it will be appreciated that any number of apertures of any size, shape, and arrangement that allow the electrode solution to flow through the electrode grate may be used.

The electrode grate also includes a spacing rim 903, which allows the electrode grate face 901 to stand substantially off of the electrode active disk surface (see FIG. 8). The spacing rim 903 may be formed substantially on the underside of the electrode grate face 901. The spacing rim 903 includes grate electrode solution ports 904 formed in the spacing rim 903 in a corresponding position to the solution inlet and outlet ports of the axial support members/reinforcing members (see FIGS. 3-7). The grate electrode solution ports 904 allow the electrode solution to flow into and out of the space created beneath the electrode grate face 901 by the spacing rim 903.

In an embodiment, the electrode grate also includes at least one electrode grate alignment feature 905. The electrode grate alignment feature 905 may be, for example, a nib formed substantially on the outer perimeter of the spacing rim 903 that substantially fits into the corresponding electrode recess alignment feature of the axial support member (see FIGS. 6-7), for example, a groove. The grate alignment feature 905 facilitates alignment of the electrode grate in the electrode grate recess so that the grate solution ports 904 are substantially aligned with the solution inlet and outlet ports of the axial support member. Although the embodiment electrode grate shown in FIG. 9 only has one electrode grate alignment feature 905, it will be appreciated that any number of electrode grate alignment features 905 may be used.

Figure 10:
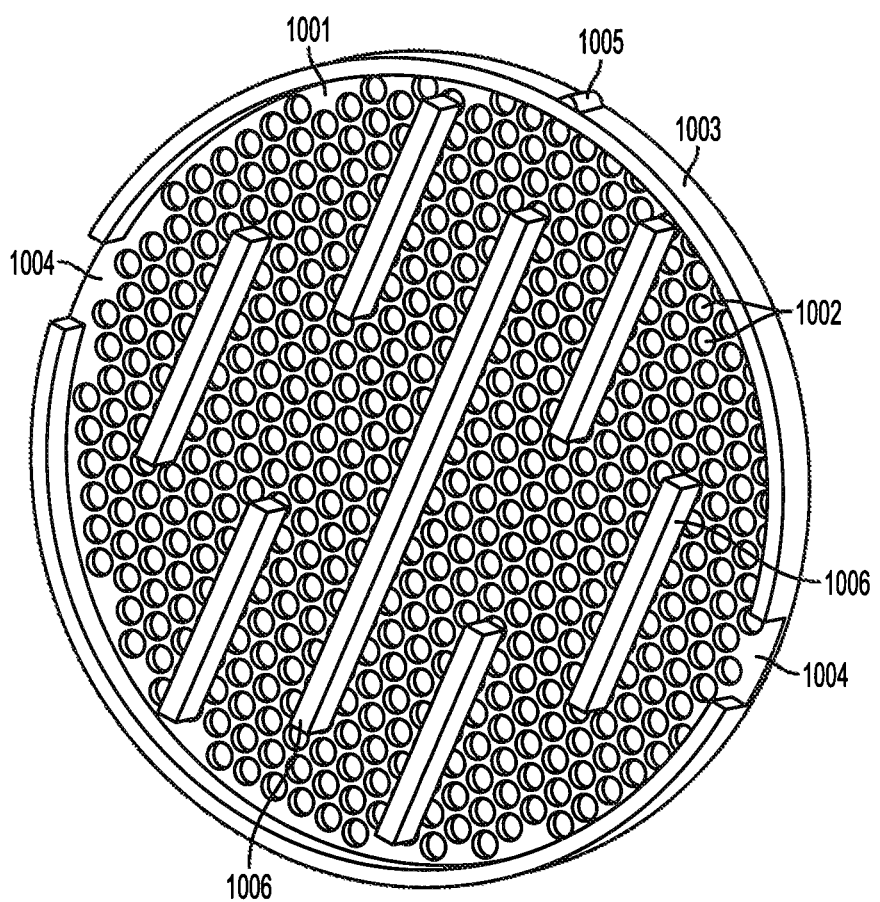
FIG. 10 is a front view of an exterior face of an electrode grate.

FIG. 10 is a substantially planar view of the exterior face, i.e., the face that faces the active surface disk of the electrode, of an electrode grate according to one embodiment. The first and second electrode grates in an embodiment are substantially the same and will not be discussed separately.

In an embodiment, the electrode grate may include an electrode grate face 1001, a plurality of exposure apertures 1002, a spacing rim 1003, grate solution ports 1004, and an electrode grate alignment feature 1005. These features are all substantially the same as elements 901-905 seen in FIG. 9 except that they are the features as seen from the exterior face, rather than the interior face, of an electrode grate. As such, the discussion above with regard to features 901-905 may be referred to for features 1001-1005.

In an embodiment, the electrode grate also includes at least one flow diverting element 1006, which promotes swirling of the electrode solution as it passes over the electrode and electrodialysis stack, helping to ensure a more complete reaction. The flow diverting elements 1006 may be formed substantially on the underside of the electrode grate face 1001.

A function of the embodiment electrode grate shown in FIGS. 9-10 is to provide sufficient support in the space between the electrode active surface and the electrodialysis stack while directing the electrode solution toward the end gasket such that it is received in the end gasket opening. It will be appreciated that any element that can perform at least this function may be used.

In an embodiment, the electrode grate shown in FIGS. 9-10 is formed from CPVC. The electrode grate may be formed from a single piece of material, for example, by a mold.

Figure 11:
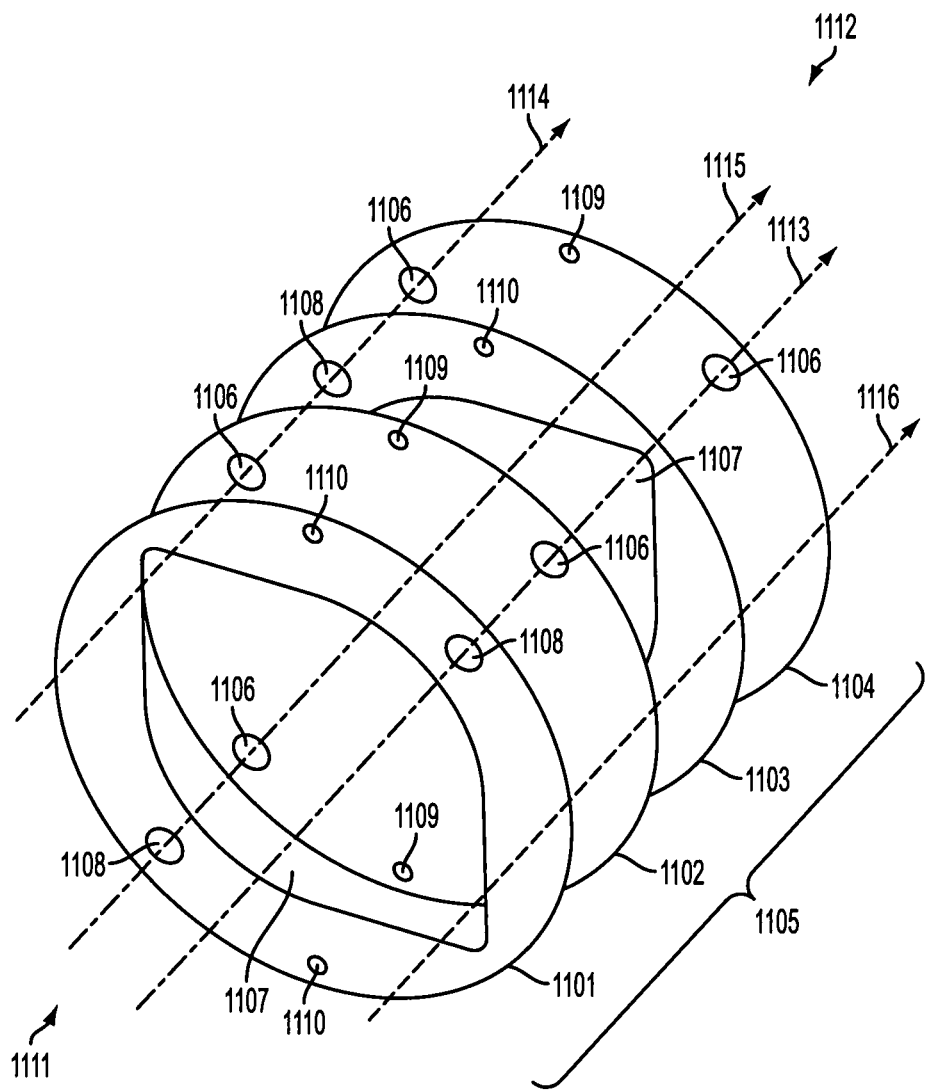
FIG. 11 shows an embodiment of an electrodialysis cell.

Turning to FIG. 11, an exploded view of an electrodialysis cell according to an embodiment is shown. The electrodialysis cell 1105 includes a first cell gasket 1101, a first ion exchange membrane 1102, a second cell gasket 1103, and a second ion exchange membrane 1104. The first and second cell gaskets 1101 and 1103 alternate with the first and second ion exchange membranes 1102 and 1104 in an axial direction such that a first cell gasket-first ion exchange membrane-second cell gasket-second ion exchange membrane sandwich is formed. The first ion exchange membrane 1102 is substantially interposed between the first and second cell gaskets 1101 and 1103, and the second cell gasket 1103 is substantially interposed between the first and second ion exchange membranes 1102 and 1104.

In an embodiment, the electrodialysis cell 1105 is a two-compartment cell configured to carry out BPMED. The first ion exchange membrane 1102 of the cell 1105 may be, for example, a BPM, and the second ion exchange membrane 1104 of the cell 1105 may be, for example, an AEM. Alternatively, the first ion exchange membrane 1102 of the cell may be, for example, a BPM, and the second ion exchange membrane 1104 of the cell may be, for example, a CEM. It will be appreciated that other pairings and arrangements of membrane types are possible, depending on the input solutions used and the desired output solution. In another embodiment, the electrodialysis cell 1105 is configured to carry out electrodialysis without bipolar membranes. The first ion exchange membrane 1102 of the cell may be, for example, an AEM, and the second ion exchange membrane 1104 of the cell may be, for example, a CEM. Other configurations of membrane types are also possible for cells 1105 configured to carry out electrodialysis without bipolar membranes, depending on the input solutions used and the desired output solution.

The ion exchange membranes 1102 and 1104 each include a plurality of membrane apertures 1106. The membrane apertures 1106 align either with the cell gasket openings 1107 or the gasket apertures 1108 of the cell gaskets 1101 and 1103 to form either the first solution or second solution loops. In an embodiment where the cell is configured to carry out either electrodialysis without bipolar membranes or two-compartment BPMED, the ion exchange membranes 1102 and 1104 each have four membrane apertures 1106. For each ion exchange membrane 1102 and 1104, the four membrane apertures 1106 serve as a conduit for first solution inlet, depicted by dashed line 1114; second solution inlet, depicted by dashed line 1113; first solution outlet, depicted by dashed line 1116; and second solution outlet, depicted by dashed line 1115. The flows of each line 1113-1116 may be reversed if desired. In an embodiment, the first solution is a basic solution and the second solution is an acidic solution. In an embodiment, the first solution is an acidic solution and the second solution is a basic solution.

For example, in an embodiment, first ion exchange membrane 1102 is a BPM, and second ion exchange membrane 1104 is an AEM such that the cell gasket opening 1107 of the first cell gasket 1101 defines a base-receiving compartment, and the cell gasket opening 1107 of the second cell gasket 1103 defines an acid-receiving compartment. Acidic solution is flowed into the apparatus at the anode end 1111 and through the electrodialysis cell 1105 via a gasket aperture 1108 in the first cell gasket and a membrane aperture 1106 in the BPM 1102; it is received in the acid-receiving compartment 1107 of cell gasket 1103; and it continues to flow through the electrodialysis cell 1105 via a membrane aperture 1106 in the AEM 1104, as depicted by dashed line 1113. Acidic solution is flowed out of the electrodialysis cell 1105 through the cathode end 1112 via a different series of apertures and cell gasket openings, as depicted by dashed line 1115. Basic solution that is flowed into the apparatus at the anode end 1111 and through the electrodialysis cell 1105 is first received in the base-receiving compartment 1107 of cell gasket 1101; it then flows through a membrane aperture 1106 in the BPM 1102, a gasket aperture 1108 in the second cell gasket 1103, and a membrane aperture 1106 in the AEM 1104, as depicted by dashed line 1114. Basic solution is flowed out of the electrodialysis cell 1105 at the cathode end 1112 via a different series of apertures and cell gasket openings, as depicted by dashed line 1116. All four flow patterns may be reversed if the flow of solutions through the apparatus is reversed.

In an embodiment, the cell gasket openings 1107 are convexly-shaped. This shape allows the cell gasket openings 1107 to be simultaneously aligned with two membrane apertures 1106 on an ion exchange membrane corresponding to the inlet and outlet apertures for the same solution. For example, the cell gasket opening 1107 of the second cell gasket 1103 is simultaneously aligned with two membrane apertures 1106 on both the first ion exchange membrane 1102 and the second ion exchange membrane 1104. In this way, the cell gasket opening 1107 of the second cell gasket 1103 defines a solution-receiving compartment between the two ion exchange membranes 1102 and 1104.

The orientation of the cell gasket openings 1107 on the cell gaskets 1101 and 1103 determines whether acidic or basic solution flows through the cell gasket openings 1107 of the cell gaskets 1101 and 1103. In an embodiment, the cell gasket opening 1107 on cell gasket 1103 is oriented to receive solution from the two membrane apertures 1106 not aligned with the cell gasket opening 1107 on cell gasket 1101, resulting in different solutions flowing through the cell gasket openings 1107 of cell gaskets 1101 and 1103.

In an embodiment, spacers (not shown) are used to substantially fill the cell gasket openings 1107 of the cell gaskets 1101 and 1103. The spacers may be, for example, polypropylene mesh, such as, for example, XN-4820 netting made by Industrial Netting. In an embodiment, the spacers are cut to a size that substantially fills the cell gasket openings 1107. The spacers may have a thickness that is approximately the same thickness as the cell gaskets 1101 and 1103, for example, 0.031", and may have a nominal hole size of approximately 0.1" and an open percent of approximately 76%. The spacers prevent the ion exchange membranes 1102 and 1104 from touching each other. They also optimize the mass transport of ions to the adjacent membrane faces by distributing the flow of solutions across the adjacent membrane surfaces.

The cell gaskets 1101 and 1103 also include a plurality of gasket apertures 1108. In an embodiment where the cell is configured to perform either electrodialysis without bipolar membranes or two-compartment BPMED, cell gaskets 1101 and 1103 each have two gasket apertures 1108. The gasket apertures 1108 may be formed in the cell gaskets 1101 and 1103 substantially directly across from each other and at an approximately 90 degree angle to the axis formed by the tips of the convexly-shaped cell gasket opening 1107. For each cell gasket 1101 and 1103, the gasket apertures 1108 allow the solution not flowing through the cell gasket opening 1107 of that specific cell gasket to continue flowing to the rest of the gaskets and membranes in the apparatus.

In an embodiment, the convexly-shaped cell gasket opening 1107 is substantially football-shaped. This modified "football" flow design pattern of the gaskets minimizes the flow dead zones. A dead zone is defined as an area where the local flow velocity is much less than the flow velocity averaged over the entire gasket surface area. For example, computational fluid dynamics modeling was used to calculate and compare the flow patterns of commercially available gaskets and spacers with rectangular cell gasket openings used in Ameridia's EUR2C-7-Bip membrane stack/electrodialysis cell, with gaskets according to an embodiment that use the modified "football" design gasket opening. For the baseline cases of the Ameridia gasket, there were noticeable flow dead zones in corners of the solution-receiving compartment and areas between the jets. In contrast, the "football" design only had a thin boundary layer along the outside wall with reduced flow velocity.

Although the cell gasket openings 1107 shown in FIG. 11 are substantially football shaped, it will be appreciated that other convexly-shaped openings that allow for simultaneous alignment of the cell gasket opening 1107 with two different membrane apertures 1106 of an exchange membrane may be used. Further, other convexly-shaped openings that minimize the dead zones in the flow may be used. For example, a smoothed diamond-shaped or other rhombus-shaped opening may be used.

In an embodiment, the ion exchange membranes 1102 and 1104 include one or more membrane alignment features 1109, and the cell gaskets 1101 and 1103 include one or more gasket alignment features 1110. The membrane alignment features 1109 may be formed substantially near the perimeter of the ion exchange membranes 1102 and 1104. The gasket alignment features 1110 may be formed substantially near the perimeter of the cell gaskets 1101 and 1103. The membrane alignment features 1109 and gasket alignment features 1110 correspond both to each other and to support member alignment features in the first and second axial supports (see FIGS. 6-7), as well as alignment features in any end ion exchange membranes, end gaskets (see FIG. 15), or additional cell gasket incorporated in the stack. The membrane alignment features 1109 and gasket alignment features 1110 allow the first and second cell gaskets 1101 and 1103 and first and second ion exchange membranes 1102 and 1104 to be aligned with and connected to each other, as well as to the axial support members and, if present, the end gaskets, end ion exchange membranes, and/or additional cell gasket. In an embodiment, aligning features such as dowel pins may inserted through the membrane and gasket alignment features 1109 and 1110 as well as the alignment features of any end gaskets, end ion exchange membranes, and/or additional cell gasket, and then inserted in the alignment features of the axial support members to facilitate alignment. The dowel pins may be, for example, stainless steel.

Although the membrane and gasket alignment features 1109 and 1110 in FIG. 11 are depicted as holes, it will be appreciated that any shape that facilitates alignment can be used. The membrane and gasket alignment features 1109 and 1110 may be formed substantially at the edges of the membranes and gasket respectively, for example as notches, such that they are not enclosed on every side by the material of the membranes or gasket. Further, although the ion exchange membranes 1102 and 1104 and cell gaskets 1101 and 1103 shown in FIG. 11 each have two alignment features, it will be appreciated that any number of alignment features can be used.

Figure 12:
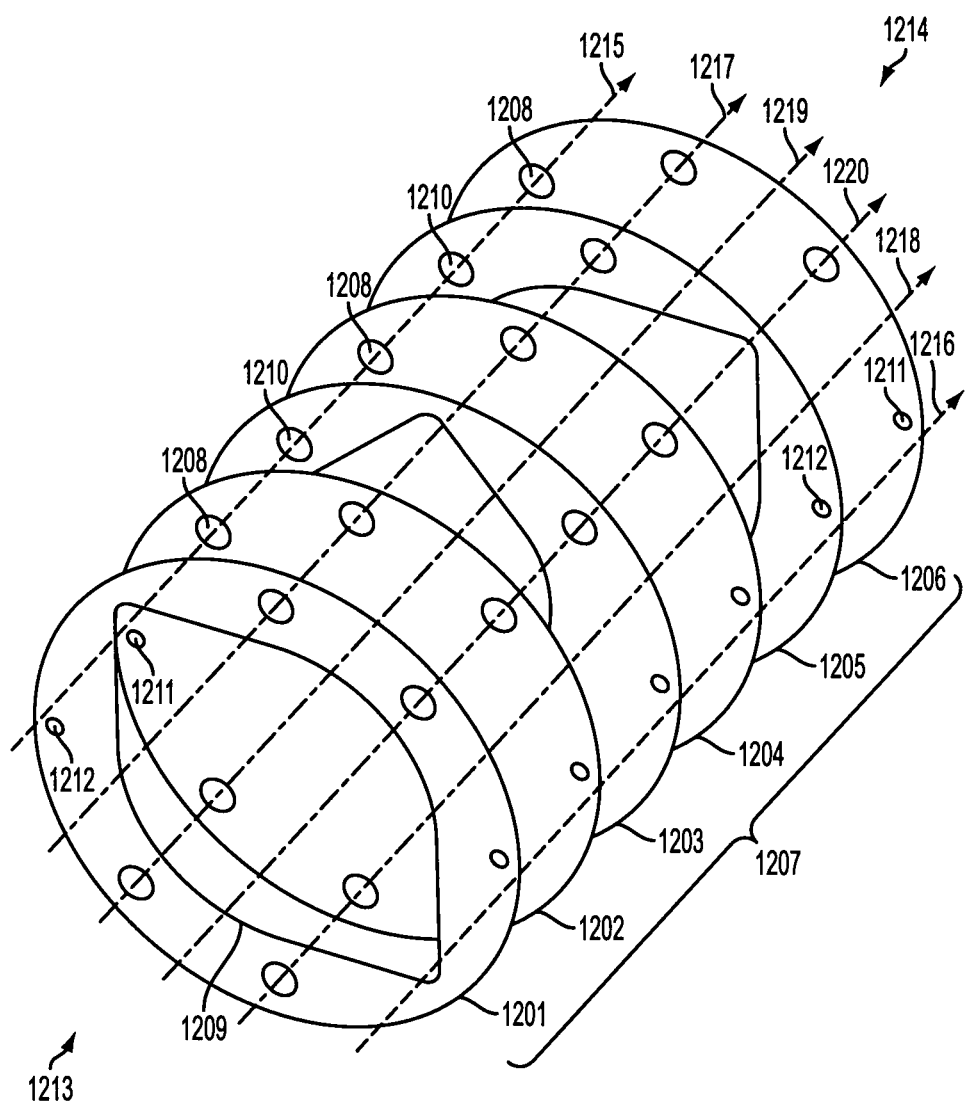
FIG. 12 shows an embodiment of an electrodialysis cell.

FIG. 12 is an exploded view of an electrodialysis cell according to another embodiment. The electrodialysis cell 1207 includes a first cell gasket 1201, a first ion exchange membrane 1202, a second cell gasket 1203, a second ion exchange membrane 1204, a third cell gasket 1205, and a third ion exchange membrane 1206. The cell gaskets 1201, 1203, and 1205 alternate with the ion exchange membranes 1202, 1204, and 1206 in an axial direction such that a first cell gasket-first ion exchange membrane-second cell gasket-second ion exchange membrane-third cell gasket-third ion exchange membrane sandwich is formed.

In an embodiment, electrodialysis cell 1207 is a three-compartment cell configured to carry out BPMED. The first ion exchange membrane 1202 of the cell 1207 may be, for example, a BPM, the second ion exchange membrane 1204 of the cell 1207 may be, for example, an AEM, and the third ion exchange membrane 1206 of the cell 1207 may be, for example, a CEM. Other arrangements of membrane types may also be possible, depending on the input solutions used and the desired output solution.

The ion exchange membranes 1202, 1204, and 1206 each include a plurality of membrane apertures 1208. In an embodiment, each membrane 1202, 1204, 1206 includes six membrane apertures 1208, two each for each of three solution loops. The membrane apertures 1208 align with either the cell gasket openings 1209 or the gasket apertures 1210 of the adjacent cell gaskets to form either the first solution loop, second solution loop, or the third solution loop. For each ion exchange membrane 1202, 1204, and 1206, the six membrane apertures 1208 serve as a conduit for first solution inlet, depicted by dashed line 1215; first solution outlet, depicted by dashed line 1216; second solution inlet, depicted by dashed line 1217; second solution outlet, depicted by dashed line 1218; third solution inlet, depicted by dashed line 1219; and third solution outlet, depicted by dashed line 1220. The flows of each line 1215-1220 may be reversed if desired. In an embodiment, the first solution is an acidic solution, the second solution is a basic solution, and the third solution is a salt solution.

For example, in an embodiment, first ion exchange membrane 1202 is a BPM, second ion exchange membrane 1204 is an AEM, and third ion exchange membrane 1206 is a CEM; cell gasket opening 1209 of the first cell gasket 1201 defines a base-receiving compartment, cell gasket opening 1209 of the second cell gasket 1203 defines an acid-receiving compartment, and cell gasket opening 1209 of the third cell gasket 1205 defines a salt solution receiving compartment. Basic solution is flowed into the apparatus at the anode end 1213 and is received in the cell gasket opening 1209 of the first cell gasket 1201; it then flows through the rest of the cell via a series of membrane apertures 1208 in the BPM 1202, AEM 1204, and CEM 1206, and gasket apertures 1210 in the gaskets 1203 and 1205, as depicted by dashed line 1215. Acidic solution is flowed into the apparatus at the anode end 1213 and through the electrodialysis cell 1207 via a gasket aperture 1210 in the first cell gasket 1201 and a membrane aperture 1208 in the BPM 1202; it is received in the acid-receiving compartment of the cell gasket 1203; and it continues to flow through the electrodialysis cell 1207 towards the cathode end 1214 via a series of membrane apertures 1208 in the AEM 1204 and the CEM 1206 and gasket apertures 1210 in gasket 1205, as depicted by dashed line 1217. Salt solution is flowed into the apparatus at the anode end 1213 via a series of gasket apertures 1210 and membrane apertures 1208 in the first and second cell gaskets 1201 and 1203 and the BPM and AEM 1202 and 1204; it is received in the salt-receiving compartment of the third cell gasket 1205; and then continues to flow through the cell toward the cathode end 1214 via a membrane aperture 1208 in the CEM 1206. All three solutions are flowed out of the cell and out of the apparatus at the cathode end 1214 through a different series of apertures and gasket openings, as depicted by dashed lines 1216, 1218, and 1220. All six flow patterns may be reversed if the flow of the solutions through the apparatus is reversed.

In an embodiment, the cell gasket openings 1209 are substantially convexly-shaped, as described above with respect to the embodiment shown in FIG. 11. The convexly-shaped opening may be substantially football shaped. Similar to the embodiment shown in FIG. 11, the orientation of the cell gasket openings 1209 of the cell gaskets 1201, 1203, and 1205 determines whether acid, base, or salt solution flows through the given cell gasket opening. For example, in the embodiment shown in FIG. 12, the first cell gasket 1201 is rotated to a first angle such that its opening 1209 receives a first solution, for example, a basic solution; the second cell gasket 1203 is rotated to a second angle such that its opening 1209 receives a second solution, for example, an acidic solution; and the third cell gasket 1205 is rotated to a third angle such that its opening 1209 receives a third solution, for example, a salt solution. Each of the cell gasket openings 1209 may be substantially filled with a spacer, as described above with respect to FIG. 11.

In an embodiment, the cell gaskets 1201, 1203, and 1205 each have a plurality of gasket apertures 1210. In an embodiment, each element 1201-1206 of the electrodialysis stack 1207 has at least one alignment feature 1211 and 1212, as described above with respect to FIG. 11.

Figure 13:
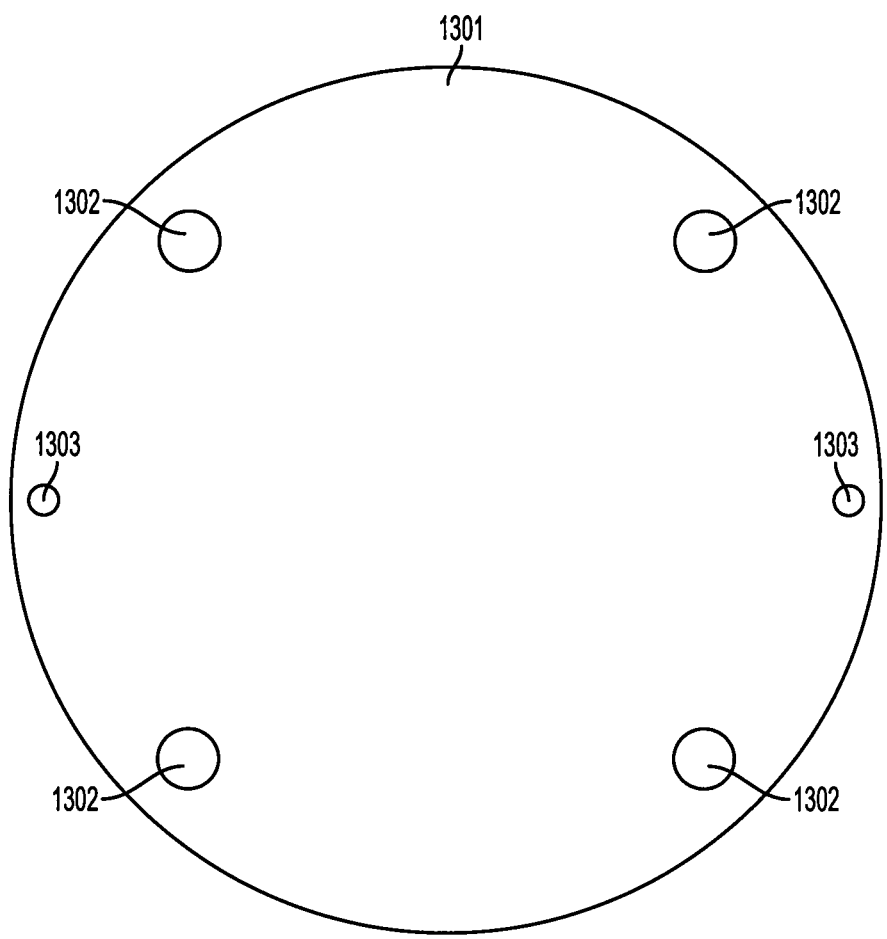
FIG. 13 is a planar view of an ion exchange membrane.
Figure 14:
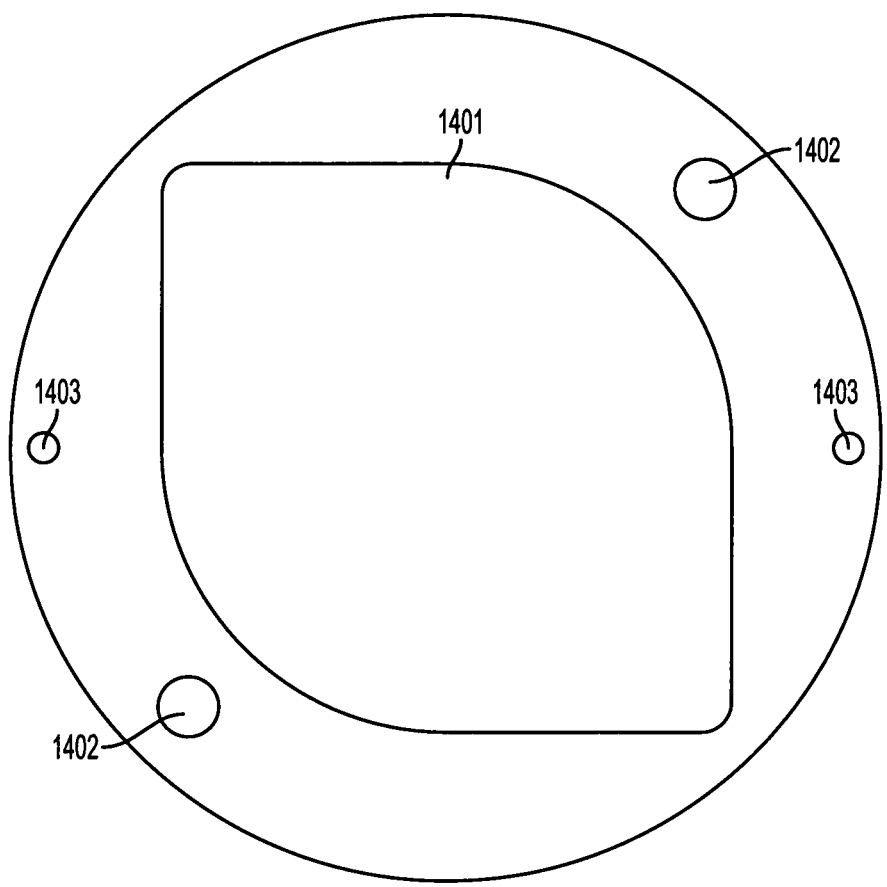
FIG. 14 is a planar view of a cell gasket.

FIGS. 13-14 show planar views of the membranes and gaskets seen in FIG. 11. The membranes and gaskets seen in FIG. 12 are substantially the same, except that the exchange membrane (FIG. 13) has six membrane apertures 1302, and the cell gasket (FIG. 14) has four gasket apertures 1402.

FIG. 13 shows a planar view of an ion exchange membrane according to an embodiment. The ion exchange membrane has a membrane surface 1301. It also includes a plurality of membrane apertures 1302. In an embodiment where the cell is configured to perform electrodialysis without bipolar membranes or two-compartment BPMED, an ion exchange membrane includes four membrane apertures 1302: two membrane apertures 1302 for the first solution loop, with one aperture serving as a first solution input and the other as an first solution output; and two membrane apertures 1302 for the second solution loop, with one aperture serving as a second solution input, and the other as a second solution output. In an embodiment where the cell is configured to perform three-compartment BPMED, an ion exchange membrane includes six membrane apertures 1302: two for the first solution loop, two for the second solution loop, and two for the third solution In an embodiment, the ion exchange membrane may also include one or more membrane alignment features 1203 to facilitate alignment of the membrane with other components of the apparatus.

The ion exchange membrane may be either an end ion exchange membrane, a first ion exchange membrane of a cell, or a second ion exchange membrane of a cell. In an embodiment, the end ion exchange membrane may be, for example, a cation exchange membrane. In an embodiment, the end ion exchange membrane may be, for example, an anion exchange membrane. In an embodiment of a high-pressure two-compartment bipolar-membrane electrodialysis apparatus, the first ion exchange membrane and the second ion exchange membrane may be, for example, a bipolar exchange membrane and an anion exchange membrane, respectively. In another embodiment of a high-pressure two-compartment bipolar-membrane electrodialysis apparatus, the first ion exchange membrane and the second ion exchange membrane may be, for example, a bipolar exchange membrane and a cation exchange membrane, respectively. In another embodiment of a high-pressure two-compartment electrodialysis apparatus, the first ion exchange membrane and the second ion exchange membrane may be, for example, an anion exchange membrane and a cation exchange membrane, respectively. In another embodiment of a high-pressure three-compartment bipolar-membrane electrodialysis apparatus, the first ion exchange membrane and the second ion exchange membrane and the third ion exchange membrane may be, for example, a bipolar exchange membrane and a anion exchange membrane and a cation exchange membrane, respectively.

FIG. 14 shows a planar view of a cell gasket, both those used in the electrodialysis cell and the additional cell gasket used in the stack, according to one embodiment. The cell gasket includes a cell gasket opening 1401 that defines a solution-receiving compartment. In an embodiment, a spacer (not shown) is inserted in the cell gasket opening 1401.

The cell gasket also includes a plurality of gasket apertures 1402. In an embodiments where the cell is configured to perform either electrodialysis without bipolar membranes or two-compartment BPMED, the cell gasket includes two gasket apertures 1402 formed in the gasket substantially directly across from each other and at an angle to the axis formed by the ends of the cell gasket opening 1401. This angle may be, for example, approximately 90 degrees. If the cell gasket opening 1401 defines a first solution-receiving compartment, then the gasket apertures 1402 are both for the second solution loop, with one aperture serving as a second solution input, and the other as a second solution output. If the cell gasket opening 1401 defines a second solution-receiving compartment, then the gasket apertures 1402 are both for the first solution loop, with one aperture serving as an first solution input, and the other as an first solution output. In an embodiment where the cell is configured to perform three-compartment BPMED, the cell gasket includes four gasket apertures 1402. If the cell gasket opening 1401 defines a first-solution receiving compartment, then two gasket apertures 1402 are for the second solution loop, and two are for the third solution loop. If the cell gasket opening 1401 defines a second-solution receiving compartment, then two gasket apertures 1402 are for the first solution loop, and two are for the third solution loop. If the cell gasket opening 1401 defines a third-solution receiving compartment, then two gasket apertures 1402 are for the first solution loop, and two are for the second solution loop.

In an embodiment, the cell gasket also includes one or more gasket alignment features 1403 to facilitate alignment of the gasket with other components of the apparatus.

Figure 15:
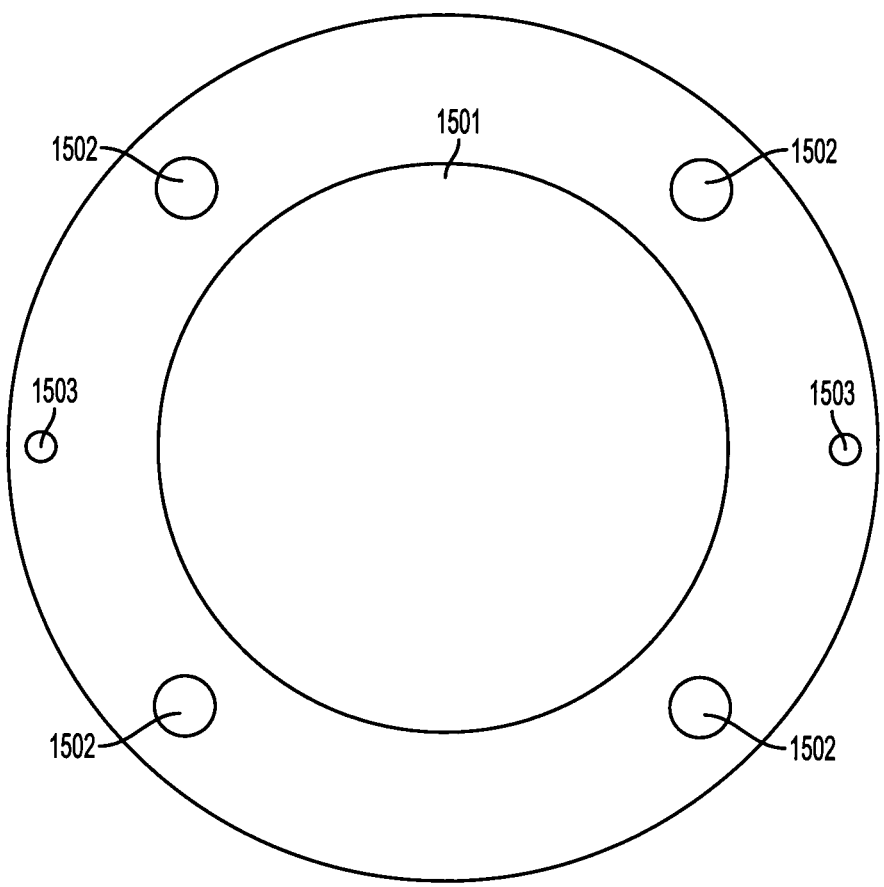
FIG. 15 is a planar view of an end gasket.

FIG. 15 shows a planar view of an end gasket configured to be used in an electrodialysis stack that includes at least one cell for electrodialysis without bipolar membranes or at least one two-compartment BPMED cell (see FIG. 11). An end gasket configured to be used in an electrodialysis stack that includes at least one three-compartment BPMED cell is substantially the same, except that it has six gasket apertures 1502.

The end gasket includes an end gasket opening 1501. In an embodiment, a spacer (not shown) is inserted in the cell gasket opening 1501. The spacer may be, for example, polypropylene mesh, such as, for example, XN-4820 netting made by Industrial Netting. In an embodiment, the spacer is cut to a size that substantially fills the end gasket opening 1501. The spacer may have a thickness that is approximately the same thickness as the end gaskets, for example, 0.031", and may have a nominal hole size of approximately 0.1" and an open percent of approximately 76%. The spacer prevents ion exchange membranes adjacent to the end gasket from touching each other. It also optimizes the mass transport of ions to the adjacent membrane faces by distributing the flow of solutions across the adjacent membrane surfaces.

In an embodiment, the end gasket opening 1501 is slightly larger than the electrode grate such that the electrode solution that flows into the electrode grate is received in the compartment defined by the end gasket opening 1501. In an embodiment, the end gasket also includes a plurality of end gasket apertures 1502. In embodiments where the cell is configured to perform either electrodialysis without bipolar membranes or two-compartment BPMED, the end gasket includes four end gasket apertures 1502: two for the first solution loop, with one aperture serving as a first solution input and the other as a first solution output; and two for the second solution loop, with one aperture serving as a second solution input, and the other as a second solution output. In an embodiment where the cell is configured to perform three-compartment BPMED, the end gasket includes six end gasket apertures 1502: two for the first solution loop, two for the second solution loop, and two for the third solution loop.

In an embodiment, the end gasket also includes one or more end gasket alignment features 1503 to facilitate alignment of the end gasket with other components of the apparatus. The end gasket alignment features 1503 may be formed substantially near the perimeter of the end gasket. The end gasket alignment features 1503 correspond to the alignment features of the ion exchange membranes and cell gaskets (see FIGS. 11-14) and the support member alignment features in the first and second axial supports (see FIGS. 6-7), as well as the alignment features of any end ion exchange membranes and additional cell gaskets incorporated in the stack. The end gasket alignment features 1503 facilitate alignment of the end gasket with these other components. Dowel pins may be used to facilitate alignment. The dowel pins may be, for example, stainless steel.

Although the end gasket alignment features 1503 in FIG. 15 are depicted as holes, it will be appreciated that any shape that facilitates alignment can be used. The end gasket alignment features 1503 may be formed substantially at the edges of the end gasket, for example as notches, such that they are not enclosed on every side by the material of the end gasket. Further, although the end gasket shown in FIG. 15 has two end gasket alignment features 1503, it will be appreciated that any number of alignment features can be used.

High-pressure electrodialysis apparatuses according to embodiments herein described can be used to perform, for example, two-compartment or three-compartment high-pressure BPMED of gas-evolving solutions or high-pressure electrodialysis without bipolar membranes of gas-evolving solutions. High-pressure electrodialysis of gas evolving solutions is capable of producing gas at any pressure between ambient pressure and the absolute pressure of the membrane stack. By pressurizing the liquid in the membrane stack and then performing ion transport into a solution from which gas evolves, this gas pressurization is accomplished much more efficiently than what is typically possible. In the case of $CO_2$, this allows direct generation of $CO_2$ gas at the pressures required either for sequestration, fuel reaction, or other applications. This may also be a benefit for other gases that could be directly generated at the elevated pressure required for a subsequent reaction step or other applications.

By operating at pressures above ambient pressure, including pressures of 20 atm or greater, a high-pressure electrodialysis apparatus according to described embodiments can suppress gas bubble evolution inside the electrodialysis membrane stack, thereby eliminating the resulting localized "hot spots" of high current density that damage the membranes. A high-pressure electrodialysis apparatus according to described embodiments allows electrodialysis of gas-evolving solutions at higher nominal current densities with improved membrane lifetimes compared to electrodialysis of the same solutions at ambient pressure. Also, by operating at pressures above ambient pressure, a high-pressure electrodialysis apparatus according to described embodiments can achieve reduced voltage and energy consumption compared to electrodialysis of the same solutions at ambient pressure. This becomes increasingly true with increasing nominal operating current density. For example, in an embodiment where two-compartment BPMED of $CO_2$-evolving bicarbonate solutions is performed at a current density of 139 $mA/cm^2$, the energy required per mole of $CO_2$ generated is reduced by 30% when operating at a pressure of 10 atm relative to operation at 1.5 atm. A high-pressure electrodialysis apparatus according to described embodiments can also be viewed as an efficient electrochemical gas pressurizer that is more efficient than employing standard apparatuses for pressurizing gas.

Figure 16:
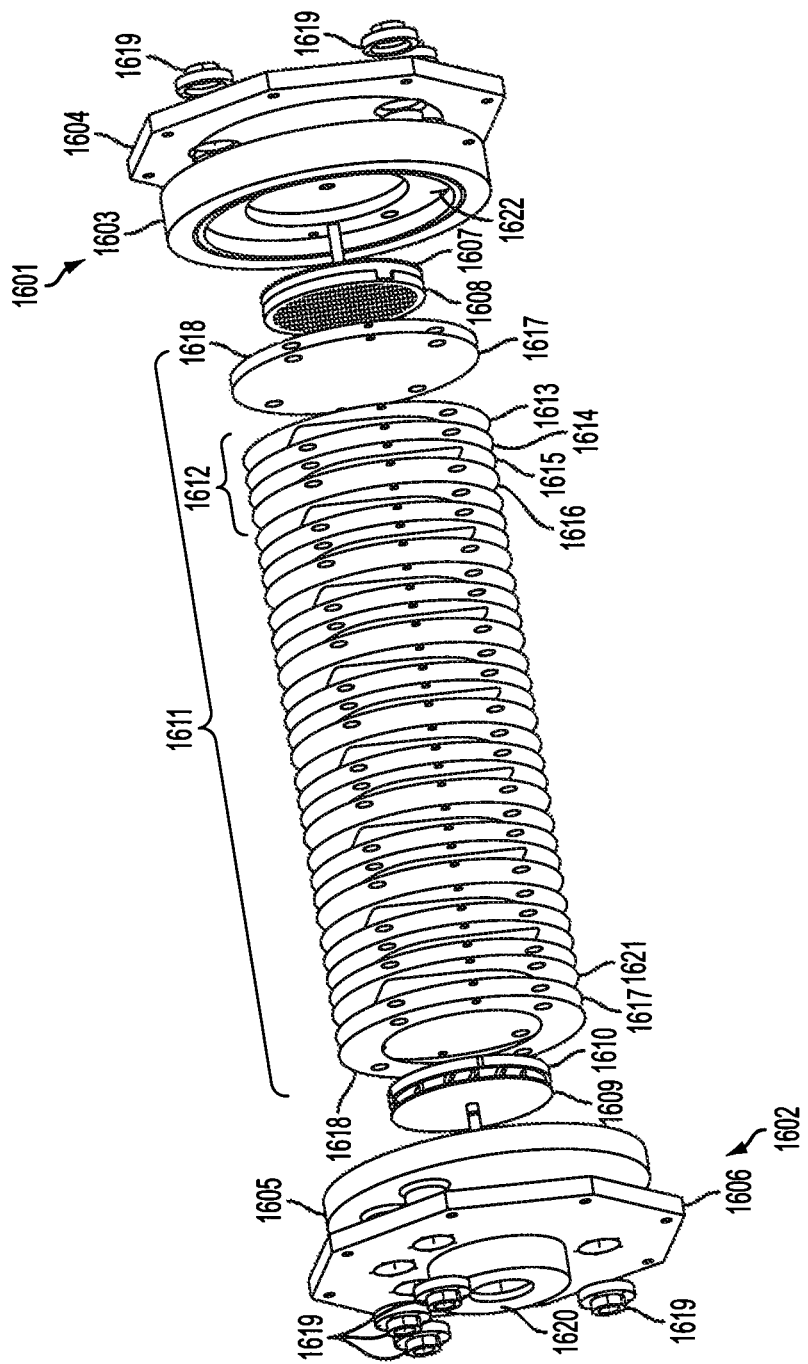
FIG. 16 is an exploded view of an embodiment of a high-pressure electrodialysis apparatus.

Turning to FIG. 16, an exploded view of an embodiment of a high-pressure electrodialysis apparatus is shown. In an embodiment, the apparatus is a high-pressure two-compartment BPMED apparatus that can be used, for example, to generate $CO_2$ gas from aqueous carbonate and bicarbonate solutions.

The high-pressure apparatus includes an anode end 1601 and a cathode end 1602. During operation, the first electrode 1607 at the anode end 1601 is held at a positive electrical potential relative to the electrical potential of the second electrode 1609 at the cathode end 1602. The housing of the high-pressure apparatus includes a first axial support member 1603 and a first reinforcing member 1604 at the anode end 1601, and a second axial support member 1605 and a second reinforcing member 1606 at the cathode end 1602. In an embodiment, the first axial support member 1603 at the anode end 1601 includes at least one pressurization port 1622. The housing further includes flange adapters 1619 that fit over the bossed ports of the first and second axial support members 1603 and 1605 when they are slid through the port holes of the first and second reinforcing members 1604 and 1606. In an embodiment, the housing may further include stress reduction cylinders 1620, one attached to each reinforcing member 1604 and 1606.

The high-pressure apparatus also includes a first electrode 1607 and first electrode grate 1608 at the anode end 1601, and a second electrode 1609 and second electrode grate 1610 at the cathode end 1602.

The high-pressure apparatus also includes an electrodialysis stack 1611 that includes a plurality of electrodialysis cells 1612. In an embodiment, the electrodialysis stack 1611 includes seven electrodialysis cells 1612; however, embodiments of the high-pressure apparatus can be adapted to receive any number of electrodialysis cells 1612. The electrodialysis cell 1612 includes a first cell gasket 1613, first ion exchange membrane 1614, second cell gasket 1615, and second ion exchange membrane 1616. In an embodiment, the first ion exchange membrane 1614 is a BPM, and the second ion exchange membrane 1616 is an AEM. Other configurations of cells, already discussed, may be alternatively used, such as three-compartment cells, or electrodialysis without bipolar membranes.

In an embodiment, the electrodialysis stack 1611 also includes end ion exchange membranes 1617, one at either end of the plurality of electrodialysis cells 1612. In an embodiment, the end ion exchange membranes 1617 are CEMs; other types of exchange membranes may be used, depending on the configuration of the stack as well as the input solutions used and the desired output solution. In an embodiment, the electrodialysis stack 1611 also includes two end gaskets 1618, one at either end of the electrodialysis stack 1611. The end gaskets 1618 are substantially interposed between the end ion exchange membranes 1617 and the electrode grates 1608 and 1610. In an embodiment, the electrodialysis stack 1611 also includes an additional cell gasket 1621 substantially interposed between the nth electrodialysis cell 1612 and the end ion exchange membrane 1617 at the cathode end 1602 of the electrodialysis stack 1611. It will be recognized that whether end ion exchange membranes 210 and an additional cell gasket 212 are needed, and what types of ion exchange membranes 210 are appropriate, depends on the input solutions used and the desired output solution. In an embodiment, the gasket openings of the cell gaskets 1612, 1615, and 1621 and the end gaskets 1618 are substantially filled with spacers.

In an embodiment, the high-pressure apparatus also includes aligning features (not shown) for aligning the elements of the electrodialysis stack 1611 to each other and to the first and second axial support members 1603 and 1605 through their respective alignment features (shown). The aligning features may be, for example, stainless steel dowel pins. An embodiment high-pressure apparatus also includes connecting features (not shown) for aligning and connecting the first and second reinforcing members 1604 and 1606 to each other through their respective connection features (shown). The connecting features may be, for example, a bolted connection such as 10 mm, class 8.8 Hex head cap screws.

High-Pressure Electrodialysis System

Figure 17:
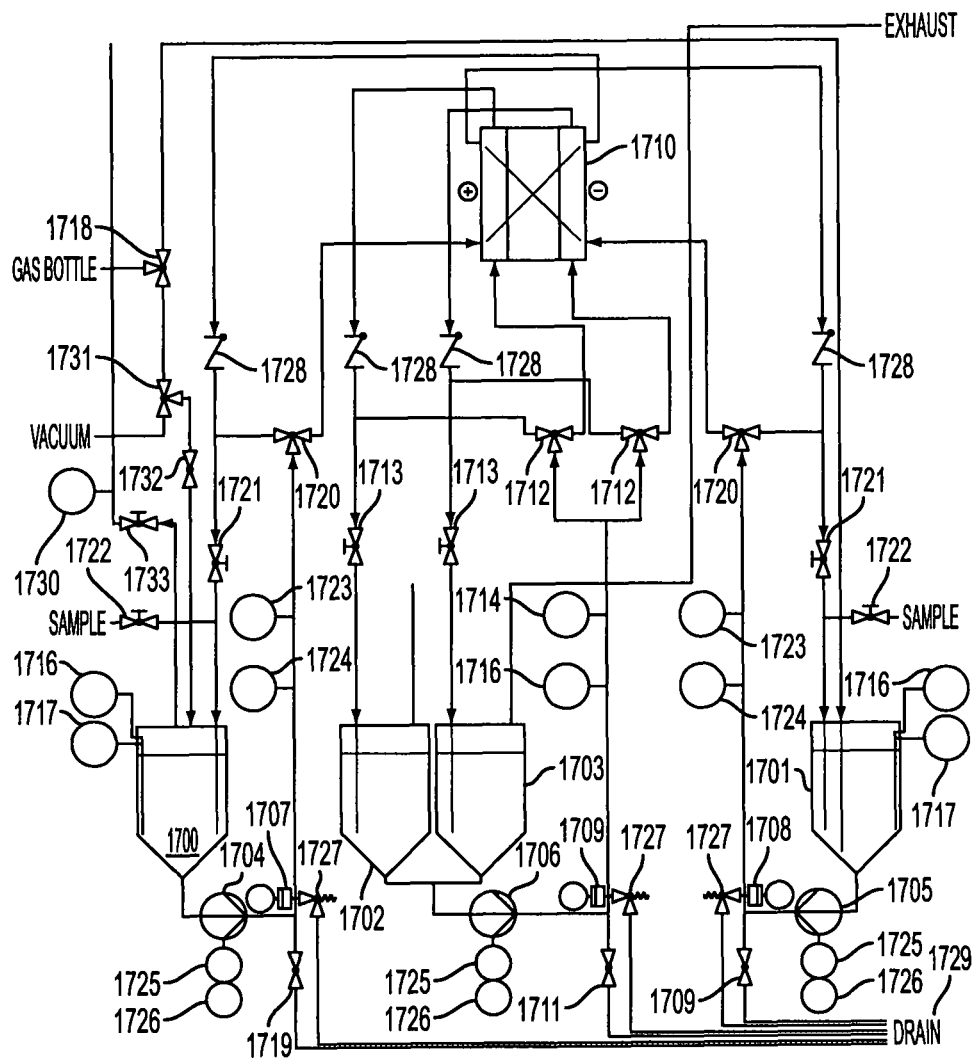
FIG. 17 is a schematic of an embodiment of a high-pressure electrodialysis system.

FIG. 17 is a schematic of an embodiment of a high-pressure electrodialysis system. The system consists of three different loops: one for a first solution, one for a second solution, and one for an electrode solution. In another embodiment, the system consists of four different loops: one for a first solution, one for a second solution, one for a third solution, and one for an electrode solution. Although FIG. 17 depicts a system with three loops such that an apparatus for conducting two-compartment BPMED or electrodialysis without bipolar membranes can be incorporated in the system, it will be appreciated that the system can be adapted to instead incorporate a three-compartment BPMED apparatus by incorporating an additional loop for a third solution.

In an embodiment, the first solution is a basic solution and the second solution is an acidic solution. In an embodiment, the first solution is an acidic solution and the second solution is a basic solution. An electrode solution may be, for example, an electrolyte. In an embodiment incorporating four loops, the third solution may be, for example, a salt solution that is diluted upon passing through the operating electrodialysis unit.

Each loop can be operated in either bypass or stack mode. When a loop operates in bypass mode, the solutions bypass the electrodialysis membrane stack of the high-pressure electrodialysis apparatus 1710. Each loop includes one or more tanks (for example, first solution tank 1700), a pump (for example, first solution pump 1704), a pulsation dampener (for example, first solution pulsation dampener 1707), one or more temperature and pH meters (for example, meter 1716), one or more temperature and conductivity meters (for example, meter 1717), one or more pressure and flow meters (for example, meters 1723 and 1723), valves to change the operation mode between bypass mode and stack mode (for example, valves 1712 and 1720), and a valve to adjust the pressure of the electrodialysis apparatus 1710 (for example, valve 1721).

In an embodiment, the high-pressure electrodialysis system also includes a high-pressure electrodialysis apparatus 1710. The high-pressure electrodialysis apparatus may be any one of the embodiments already discussed. In an embodiment, the electrodialysis apparatus 1710 includes a BPMED stack such that the electrodialysis system of FIG. 1 can be used, for example, to generate $CO_2$ gas from aqueous carbonate and bicarbonate solutions.

In an embodiment, tanks 1700-1703 of the high-pressure electrodialysis system are designed to withstand pressures up to approximately 20 atm with a safety factor of about 3. The tanks 1700-1703 can be pressurized to any pressure between ambient pressure and the absolute pressure of the electrodialysis stack. When the tanks are so pressurized, gas evolves out of solution at a pressure above ambient pressure, i.e., at a pressure substantially the same as the pressure of the tanks 1700-1703. In an embodiment, the covers of the tanks 1700-1703 have three threaded holes of a diameter of ¼ inch for optional pipe connections and a fill cap of a diameter of 1⅛ inch to fill the tanks 1700-1703.

In an embodiment, the first and second solution tanks 1700 and 1701 each have both an inlet coming from the bypass or the electrodialysis apparatus 1710 and an outlet going to the first solution pump 1704 or second solution pump 1705 respectively. Both tanks 1700 and 1701 have a feed-through where the pH and the conductivity meters 1716 and 1717 are introduced into the solution. The cover of the second solution tank 1701 is equipped with a vent and a ⅛ inch pipe for gas infusion. In an embodiment, the first solution tank 1700 has two windows to observe the evolution of gas bubbles from the solution. In an embodiment where the tank is pressurized, the tank cover may be equipped with a pressure sensor to know the pressure of the tank. The tank may also be equipped with two vents: one that leads the gas to a valve and a flow meter in order to regulate and measure the flow of gas evolving from the solution, and one to empty the headspace and flush the tank with gas.

In an embodiment, the first and second solution tanks 1700 and 1701 both have meters for measuring, showing, and recording certain information about the tank conditions. For example, the first solution tank 1700 may include temperature and pH information and recording to computer (TXIR) meter 1716 that measures, shows, and records the temperature and pH of the first solution. The first solution tank 1700 may also include a TXIR meter 1717 that measures, shows, and records the temperature and conductivity of the first solution. The second solution tank 1701 may also have a TXIR meter 1716 and TXIR meter 1717 that perform the same functions for the second solution.

In an embodiment, the second solution tank 1701 may also have a means for infusing gas into the second solution in order to regenerate the gas while operating through the electrodialysis stack. For example, in an embodiment electrodialysis system that is used to generate $CO_2$ gas, the second solution tank 1701 may be a base solution tank that has a $CO_2$ gas bottle connected to it by, for example, a ⅛ inch pipe. The infusion of gas into the second solution tank 1701 can be turned on or off using valve 1718.

In an embodiment, the first solution loop also includes a valve 1719 to drain the first solution loop and a valve 1720 to change the operation from the bypass to the electrodialysis stack mode. The second solution loop also includes valves 1719 and 1720 that perform the same functions with respect to the second solution loop. The first solution loop also includes a valve 1721 to change the pressure in the electrodialysis system and a valve 1722 for taking samples. The second solution loop also includes valves 1721 and 1722 that perform the same functions with respect to the second solution loop. In an embodiment, the pressure and the flow of the first solution loop are measured and recorded by pressure information and recording to computer (PIR) meter 1723 and flow information and recording to computer (FIR) meter 1724, respectively. The second solution loop also includes PIR meter 1723 and FIR meter 1724 that perform the same functions with respect to the second solution loop.

In an embodiment, the electrode solution loop has two tanks 1702-1703. Each tank 1702-1703 has an inlet coming from the bypass or the electrodialysis apparatus 1710 and an outlet going to the electrode solution pump 1706. The electrode solution tank 1702 is for the electrode solution coming from the anode end of the electrodialysis apparatus from where oxygen will evolve. The electrode solution tank 1703 is for the fluid coming from the cathode end of the electrodialysis apparatus from where hydrogen will evolve. In an embodiment, each tank 1702-1703 is equipped with a pipe connection that has a ¼ inch barb fitting to vent the tanks from the evolving gases. The vent of tank 1703 may be connected to the building exhaust to avoid high $H_2$ concentrations in the atmosphere.

In an embodiment, the electrode solution loop also has a valve 1711 to drain the electrode solution loop. It may also include two valves 1712 to change the operation from the bypass to the electrodialysis stack mode. It may also include two valves 1713 that can be varied in order to change the pressure in the electrodialysis system. In an embodiment, the pressure and flow of the electrode solution loop are measured and recorded by PIR meter 1714 and FIR meter 1715, respectively.

In an embodiment, each port of the electrodialysis apparatus 1710 is equipped with a check valve 1728 to avoid the flow of any solution into the electrodialysis apparatus 1710 while the system operates in the bypass mode. Each loop has a pulsation dampener 1707 to damp the pressure oscillation caused by the operation of the positive displacement pumps 1704.

In an embodiment, the electrodialysis system includes valve 1731, a three-way valve connected to a house vacuum. Before the electrodialysis system is used, valve 1731 can be alternately opened and closed with valve 1718, which is connected to a cylinder of whatever gas the system is being used to generate, for example, $CO_2$. Doing so purges the headspace of first solution tank 1700 of air so that the headspace contains nothing but whatever gas the system is being used to generate, for example, $CO_2$. Purging the headspace in this manner ensures that all the gas that flows through FIR meter 1730 is pure, or as close to pure as possible, which ensures accurate measurements of the gas flow by FIR meter 1730.

In an embodiment, the electrodialysis system includes motors 1725, one motor for each of the first solution, second solution, and electrode solution loops. It also includes Hz/RPM controllers 1726, one each for the first solution, second solution, and electrode solution loops. It also includes pressure relief valves 1727, one each for the first solution, second solution, and electrode solution loops. It also includes valve 1732, a two-way valve that allows the operator of the system to connect or block the flow from the vacuum or gas cylinder; which is blocked depends on the settings of valve 1731 and valve 1718. It also includes valve 1733, a needle valve for controlling the gas flow through FIR meter 1730. The electrodialysis system also includes a drain 1729 to receive any solution drained from tanks 1700-1703 via their respective valves 1711 and 1719.

In an embodiment, the values of each measuring position of the system are read and recorded every five seconds by computer software. These values can be saved and recalled when desired. Table 1 summarizes the measuring positions of one embodiment of a system and their functions. Other measurement positions not shown on the schematic are those that measure the voltage and current going through the membrane stack.

TABLE 1

Measuring Positions and their Functions

| Measuring Position | Function | Input/Output |
|---|---|---|
| FIR meters 1715, 1724 | Measure, show, and record the flow of the loop | Input |
| PIR meters 1714, 1723 | Measure, show, and record the pressure of the loop | Input |
| TXIR meters 1716, 1717 | Measure, show, and record the temperature and either the pH or the conductivity of the base or acid solution | Input |
| FIR meter 1730 | Measures, shows, and records the flow of the gas evolving from the acid tank | Input |
| VFD meters 1726 | Record and control the frequency or RPM of the motor. Builds a control loop with the FIR to control the flow of the loop. | Output |

In an embodiment, the electrodialysis system of FIG. 17 can be constructed with the following: positive displacement pumps (model M03SASGSSEMA pump from HydraCell); variable frequency motor drives (model VS1SP61-1B VFD from Baldor); motors (model IDNM3583 from Baldor); pulsation dampeners (model 110-065 from HydraCell); pressure relief valves (model RV2MF-6N-A-S316 from Hy-Lok); flowmeters (model FTB4805 from Omega); pressure sensors (model PX219 from Omega); pH meters (model OrionStar from ThermoScientific); conductivity meters (model OrionStar from ThermoScientific); power supply (model XHR40-25 from Xantrex); gas flow meter (model FMA1605A from Omega); data acquisition module model USB-1616HS-4 from Measurement Computing); RS485 communication card (model PCI4S422DB94PR from StarTech); USB to RS232 multiport convertor (model USB-8COM from VSCOM); stainless steel rack and secondary containment (in house design and outside fabrication); numerous 316SS valves, fittings, hoses, tubing (from McMaster-Carr); acid, base, and electrolyte tanks (in house design and fabrication); an embodiment of a high-pressure electrodialysis apparatus as already described; H₂ sensor for safety; vent system for exhaust gases; gas tank and regulator for headspace flushing and base gas infusion; and de-ionized (DI) water line for system flushing.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. An electrodialysis apparatus comprising:
an electrodialysis stack;
a pair of electrode grates, the electrodialysis stack positioned between the pair of electrode grates;
a pair of electrodes, wherein the electrodialysis stack and the pair of electrode grates are all positioned between the pair of electrodes; and
a housing configured to pressurize the electrodialysis stack at a stack pressure, the housing including a cell chamber configured to receive the electrodialysis stack, the cell chamber including at least one pressurization port communicating with the cell chamber such that a portion of an electrode solution is transmittable into a region of the cell chamber outside the electrodialysis stack,
wherein each electrode grate of the pair of electrode grates comprises a spacing rim configured to raise the electrode grate face away from an electrode of the pair of electrodes.

2. The electrodialysis apparatus of claim 1, the electrodialysis stack comprising:
two end gaskets, the two end gaskets each comprising one end gasket opening and at least four end gasket apertures; and
at least one electrodialysis cell substantially interposed between the two end gaskets, the at least one electrodialysis cell comprising:
at least two cell gaskets, the at least two cell gaskets each comprising one cell gasket opening and at least two cell gasket apertures; and
at least two ion exchange membranes, the at least two ion exchange membranes each comprising at least four membrane apertures, the at least two ion exchange membranes alternating in an axial direction with the at least two cell gaskets.

3. The electrodialysis apparatus of claim 2, wherein the two end gaskets, the at least two cell gaskets, and the at least two ion exchange membranes all further comprise at least one alignment feature such that they are alignable and connectable with each other and with the housing.

4. The electrodialysis apparatus of claim 2, wherein the at least two ion exchange membranes are one of a bipolar exchange membrane, an anion exchange membrane, or a cation exchange membrane.

5. The electrodialysis apparatus of claim 2, the electrodialysis stack further comprising at least one end ion exchange membrane substantially interposed between the two end gaskets and the at least one electrodialysis cell, the at least one end ion exchange membrane comprising at least four membrane apertures.

6. The electrodialysis apparatus of claim 5, wherein the two end gaskets, the at least two cell gaskets, the at least two ion exchange membranes, and the at least one end ion exchange membrane each further comprise at least one alignment feature such that they are alignable and connectable with each other and with the housing.

7. The electrodialysis apparatus of claim 5, wherein the at least one end ion exchange membrane is one of a bipolar exchange membrane, an anion exchange membrane, or a cation exchange membrane.

8. The electrodialysis apparatus of claim 5, the electrodialysis stack further comprising an additional cell gasket substantially interposed between the two end gaskets and the at least one electrodialysis cell, the additional cell gasket comprising one cell gasket opening and at least two cell gasket apertures.

9. The electrodialysis apparatus of claim 8, wherein the two end gaskets, the at least two cell gaskets, the at least two ion exchange membranes, the at least one end ion exchange membrane, and the additional cell gasket each further comprise at least one alignment feature such that they are alignable and connectable with each other and with the housing.

10. The electrodialysis apparatus of claim 8, wherein the cell gasket openings are convexly-shaped.

11. The electrodialysis apparatus of claim 1, wherein the housing comprises:
a first axial support member and a second axial support member configured to be operatively connected to form the cell chamber; and
a first reinforcing member operatively connected to the first axial support member and a second reinforcing member operatively connected to the second axial support member such that the first and second axial support members are disposed between the first and second reinforcing members.

12. The electrodialysis apparatus of claim 11, the first and second axial support members each comprising:
an electrode solution inlet port extending through the axial support members such that the electrode solution is transmittable into the apparatus;
an electrode solution outlet port extending through the axial support members such that the electrode solution is transmittable out of the apparatus;
at least two solution ports extending through the axial support members such that at least two solutions are transmittable into or out of the apparatus; and
an electrode stem hole extending through the axial support members such that an electrode stem is insertable through the axial support members.

13. The electrodialysis apparatus of claim 12, wherein the first and second axial support members each further comprise an electrode recess configured to receive one electrode of the pair of electrodes and one electrode grate of the pair of electrode grates.

14. The electrodialysis apparatus of claim 13, wherein the electrode recess comprises at least one electrode recess alignment feature configured to substantially align the electrode grate in the electrode recess.

15. The electrodialysis apparatus of claim 12, wherein the first axial support member further comprises a cell recess configured to receive the electrodialysis stack.

16. The electrodialysis apparatus of claim 15, wherein the first and second axial support members further comprise at least one support member alignment feature configured to substantially align the electrodialysis stack with the first and second axial support members in an axial direction and to substantially align the first and second axial support members with each other.

17. The electrodialysis apparatus of claim 12, wherein the electrode solution ports and the at least two solution ports are each substantially bossed through a backside of the first and second axial support members.

18. The electrodialysis apparatus of claim 12, wherein the electrode solution ports each have a first length that is less than a distance to the cell chamber and a second length that is formed at an angle to the first length.

19. The electrodialysis apparatus of claim 11, wherein the first and second reinforcing members comprise:
- an electrode solution inlet port hole extending through the reinforcing members such that an electrode solution can pass through the reinforcing members;
- an electrode solution outlet port hole extending through the reinforcing members such that an electrode solution can pass through the reinforcing members;
- at least two solution port holes extending through the reinforcing members such that at least two solutions can pass through the reinforcing members; and
- an electrode stem hole extending through the reinforcing members such that an electrode stem is insertable through the reinforcing members.

20. The electrodialysis apparatus of claim 19, wherein the port holes and electrode stem hole are radiused.

21. The electrodialysis apparatus of claim 19, wherein the first and second reinforcing members further comprise one or more of a stress reduction cylinder and a plurality of flange adapters each substantially connected to an outer side of the reinforcing members.

22. The electrodialysis apparatus of claim 1, each electrode grate of the pair of electrode grates comprising:
- an electrode grate face comprising a plurality of exposure apertures configured to allow the electrode solution to flow past the electrode grate and into the cell chamber;
- a spacing rim formed substantially on an underside of the electrode grate face and configured to raise the electrode grate face away from an electrode of the pair of electrodes;
- at least one grate solution port formed substantially within the spacing rim and configured to allow the solution to flow under the electrode grate face; and
- at least one flow diverting element formed substantially on the underside of the electrode grate face and configured to promote swirling of the electrode solution as it passes over the electrode and into the cell chamber.

23. The electrodialysis apparatus of claim 22, wherein each electrode grate of the pair of electrode grates further comprise at least one electrode grate alignment feature formed substantially on the spacing rim and configured to align the electrode grate in the housing.

* * * * *